United States Patent
Cavaliere et al.

(10) Patent No.: US 9,490,931 B2
(45) Date of Patent: Nov. 8, 2016

(54) MUXPONDER AND METHOD OF CONVERTING A PLURALITY OF TRIBUTARY OPTICAL COMMUNICATIONS SIGNALS HAVING A FIRST BIT RATE INTO AN OPTICAL LINE SIGNAL HAVING A SECOND, HIGHER BIT RATE

(75) Inventors: Fabio Cavaliere, Vecchiano (IT); Gianluca Meloni, Leghorn (IT); Marco Secondini, Rome (IT); Luca Poti, Pisa (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 103 days.

(21) Appl. No.: 14/358,696

(22) PCT Filed: Dec. 22, 2011

(86) PCT No.: PCT/EP2011/073796
§ 371 (c)(1),
(2), (4) Date: Jan. 5, 2015

(87) PCT Pub. No.: WO2013/091706
PCT Pub. Date: Jun. 27, 2013

(65) Prior Publication Data
US 2016/0065325 A1   Mar. 3, 2016

(51) Int. Cl.
*H04J 14/02* (2006.01)
*H04J 14/08* (2006.01)
(Continued)

(52) U.S. Cl.
CPC ........... *H04J 14/06* (2013.01); *H04B 10/5161* (2013.01); *H04B 10/541* (2013.01);
(Continued)

(58) Field of Classification Search
CPC ....... H04J 14/06; H04J 14/0223; H04J 14/08
USPC ...................................... 398/65, 63, 43, 176
See application file for complete search history.

(56) References Cited

U.S. PATENT DOCUMENTS 5,701,372 A * 12/1997 Magel ................... G02B 6/2861
  385/129
5,938,309 A *  8/1999 Taylor ..................... H04J 14/02
  375/214
(Continued)

FOREIGN PATENT DOCUMENTS

WO    WO-9854854 A1    12/1998

OTHER PUBLICATIONS

International Search Report, Application No. PCT/EP2011/073796, Sep. 24, 2012, 3 pages.
(Continued)

*Primary Examiner* — Oommen Jacob
(74) *Attorney, Agent, or Firm* — NDWE LLP

(57) ABSTRACT

A muxponder comprising: modulation format conversion apparatus comprising:
first and second inputs each arranged to receive an amplitude modulated tributary optical signal carrying a communications traffic bit stream;
first and second optical to electrical signal conversion apparatus each arranged to receive a respective tributary optical signal and to convert it into a corresponding tributary electrical signal carrying the communications traffic bit stream;
a delay element arranged to synchronize the communications traffic bit streams; and
an optical IQ modulator arranged to receive an optical carrier signal and the tributary electrical signals. The optical IQ modulator having an in-phase arm and a quadrature arm, each arm being arranged to receive one of the tributary electrical signals such that each tributary electrical signal drives the respective arm of the optical IQ modulator to encode the communications traffic bit streams onto the optical carrier signal in a multilevel modulation format.

13 Claims, 14 Drawing Sheets

(51) Int. Cl.
*H04B 10/00* (2013.01)
*H04J 14/06* (2006.01)
*H04B 10/516* (2013.01)
*H04B 10/556* (2013.01)
*H04B 10/54* (2013.01)

(52) U.S. Cl.
CPC ............ *H04B10/556* (2013.01); *H04J 14/02* (2013.01); *H04J 14/0223* (2013.01); *H04J 14/0273* (2013.01); *H04J 14/08* (2013.01)

(56) References Cited

U.S. PATENT DOCUMENTS

| | | | | |
|---|---|---|---|---|
| 6,101,011 | A * | 8/2000 | Taylor | H04B 10/29 398/1 |
| 6,714,742 | B1 * | 3/2004 | Hayee | H04B 10/532 398/152 |
| 6,810,215 | B1 * | 10/2004 | Oikawa | H04B 10/27 398/175 |
| 8,842,997 | B2 * | 9/2014 | Liu | H04B 10/5053 398/182 |
| 2007/0071453 | A1 | 3/2007 | Liu et al. | |
| 2009/0073450 | A1 * | 3/2009 | Boyd | G01B 9/02 356/454 |
| 2009/0148171 | A1 * | 6/2009 | Chen | H04B 10/677 398/208 |
| 2010/0080570 | A1 * | 4/2010 | Conroy | H04B 10/5057 398/154 |
| 2011/0013911 | A1 * | 1/2011 | Alexander | H04B 10/29 398/79 |
| 2011/0109953 | A1 * | 5/2011 | Vassilieva | H04B 10/2557 359/259 |
| 2011/0158654 | A1 * | 6/2011 | Zhang | H04B 10/5053 398/158 |
| 2011/0217040 | A1 * | 9/2011 | Mori | H04J 14/06 398/53 |
| 2012/0213521 | A1 * | 8/2012 | Zhang | H04J 14/02 398/79 |
| 2012/0250793 | A1 * | 10/2012 | Khatana | H04L 27/364 375/308 |
| 2013/0071119 | A1 * | 3/2013 | Liu | H04B 10/516 398/65 |
| 2015/0117869 | A1 * | 4/2015 | Wakayama | H04B 10/5053 398/185 |
| 2016/0065325 | A1 * | 3/2016 | Cavaliere | H04J 14/06 398/65 |

OTHER PUBLICATIONS

Roberts, Kim, et al., "Performance of Dual-Polarization QPSK for Optical Transport Systems", IEEE, Journal of Lightwave Technology. vol. 27. No. 16, Aug. 15, 2009, 14 pages.

International Preliminary Report on Patentability, Application No. PCT/EP2011/073796, dated Jul. 3, 2014, 9 pages.

* cited by examiner

MUXPONDER AND METHOD OF CONVERTING A PLURALITY OF TRIBUTARY OPTICAL COMMUNICATIONS SIGNALS HAVING A FIRST BIT RATE INTO AN OPTICAL LINE SIGNAL HAVING A SECOND, HIGHER BIT RATE

CROSS-REFERENCE TO RELATED APPLICATIONS

This application is a National stage of International Application No. PCT/EP2011/073796, filed Dec. 22, 2011, which are hereby incorporated by reference.

TECHNICAL FIELD

The invention relates to a muxponder and to a method of converting a plurality of tributary optical communications signals having a first bit rate into an optical line signal having a second, higher bit rate.

BACKGROUND

A muxponder (from "multiplexing transponder") is a device that maps a plurality of low data rate input optical signals into a single higher data rate optical signal. The modulation format and line code can, generally but not necessarily, be different for the input and output signals. Although the concept is simple, the implementation of a muxponder can be very complicated. Before multiplexing the tributary signals in the time domain to form an output data frame at higher speed, they must first be converted from the optical to the electrical domain, and then they need to be synchronized and resampled. Overhead bits needed for error correction and maintenance functionalities must also be added. In order to improve link distance or spectral efficiency, conversion to multi-level modulation formats may be required. At ultra high speed data rates (400 Gbit/s and 1 Terabit/s) the implementation of all these functionalities is very challenging, due to the bandwidth limitations introduced by the opto-electronic devices used when converting the signals between the optical and electrical domains.

SUMMARY

It is an object to provide an improved muxponder. It is a further object to provide an improved method of converting a plurality of tributary optical communications signals having a first bit rate into an optical line signal having a second, higher bit rate.

A first aspect of the invention provides a muxponder comprising modulation format conversion apparatus. The modulation format conversion apparatus comprises first and second inputs, first and second optical to electrical signal conversion apparatus, at least one delay element and an optical IQ modulator. The first and second inputs are each arranged to receive a respective amplitude modulated tributary optical signal carrying a respective communications traffic bit stream. The first and second optical to electrical signal conversion apparatus are each arranged convert a respective one of the tributary optical signals into a corresponding amplitude modulated tributary electrical signal carrying the respective communications traffic bit stream. The at least one delay element is arranged to synchronise the communications traffic bit streams. The optical IQ modulator has an in-phase arm and a quadrature arm. The optical IQ modulator is arranged to receive an optical carrier signal and the tributary electrical signals. Each arm of the optical IQ modulator is arranged to receive a respective one of the tributary electrical signal, such that each said tributary electrical signal drives the respective arm of the optical IQ modulator to thereby encode the communications traffic bit streams onto the optical carrier signal in a multilevel modulation format.

By converting the amplitude modulated tributary optical signals into the electrical domain and using the corresponding tributary electrical signals to drive the two arms of the optical IQ modulator use of complex and costly electronic circuitry to perform resampling and time division multiplexing of electrical signals may be avoided. The muxponder may thereby provide a simple architecture for multiplexing low bit rate tributary optical signals into a high bit rate optical line signal.

In an embodiment, the at least one delay element is an optical delay line provided before the respective optical to electrical signal conversion apparatus. Synchronisation of the traffic bit streams carried by the tributary optical signals may therefore be realised in the optical domain, which may avoid the need for costly, power consuming electronic circuitry to perform the synchronisation.

In an embodiment, the modulation format conversion apparatus further comprises third and fourth inputs, and first and second optical signal combining apparatus. The third and fourth inputs are each arranged to receive a respective said amplitude modulated tributary optical signal. The first optical signal combining apparatus is provided between the first and second inputs and the first optical to electrical signal conversion apparatus. The second optical signal combining apparatus is provided between the third and fourth inputs and the second optical to electrical signal conversion apparatus. Each optical signal combining apparatus is arranged to receive a said tributary optical signal from each respective input and each optical signal combining apparatus is arranged to combine the amplitude modulated tributary optical signals to form a respective tributary optical signal having a four-level modulation format. The muxponder may convert a plurality of amplitude modulated tributary optical signals into an optical line signal having a higher level modulation format, such as 16-quaternary amplitude modulation, 16-QAM.

In an embodiment, the modulation format conversion apparatus comprises a plurality, N, of inputs, and a plurality, N/2, of optical signal combining apparatus. Each input is arranged to receive a respective said amplitude modulated tributary optical signal. The optical signal combining apparatus are arranged in series in a plurality, n, of combining stages, where $2^n = N/2$, between each said optical to electrical signal conversion apparatus and the respective inputs. The muxponder may convert a plurality of amplitude modulated tributary optical signals into an optical line signal having a higher level modulation format, such as 64-QAM.

In an embodiment, each optical signal combining apparatus comprises an optical gain element, an optical delay element and an optical multiplexer. The optical gain element is arranged to receive the amplitude modulated tributary optical signal from one respective input. The optical gain element is arranged to apply an optical gain to the said signal. The optical delay element is arranged to receive the amplitude modulated tributary optical signal from the other respective input. The optical delay element is arranged to apply a delay to the said signal. The optical coupler is arranged to receive the respective amplitude modulated tributary optical signals from the gain element and from the optical delay element and the optical coupler is arranged to combine the said signals to form the respective tributary optical signal having the four-level modulation format. A four level tributary optical signal may be formed by attenuating the amplitude of one of the amplitude modulated tributary optical signals to one half of the amplitude of the other amplitude modulated tributary optical signal.

In an embodiment, the optical gain element is an optical attenuator arranged to apply an attenuation to the amplitude modulated tributary optical signal. The optical delay element is an optical delay line. The optical multiplexer is an optical coupler.

In an embodiment, the muxponder further comprises first and second overhead insertion apparatus. Each overhead insertion apparatus is provided between the respective optical to electrical signal conversion apparatus and the optical modulator. Each overhead insertion apparatus is arranged to insert respective overhead bits into the communications traffic bit stream of the respective tributary electrical signal. Inserting the overhead into the communications traffic bit streams carried by the tributary electrical signals may enable the overhead to be inserted using low speed electronics.

In an embodiment, the muxponder comprises a multiplexing stage. The multiplexing stage comprises first and second said modulation format conversion apparatus and a polarisation beam combiner. The optical IQ modulator of the first modulation format conversion apparatus is arranged to receive a first optical sub-carrier signal having a carrier wavelength and a first polarisation state. The optical IQ modulator of the second modulation format conversion apparatus is arranged to receive a second optical sub-carrier signal having the carrier wavelength and a second polarisation state. The polarisation beam combiner is arranged to receive the first and second optical sub-carrier signals from the optical modulator. The polarisation beam combiner is arranged to polarisation multiplex the first and second optical sub-carrier signals to form a dual polarisation optical carrier signal having the carrier wavelength and carrying the communications traffic bit streams encoded in the multilevel modulation format. Polarisation multiplexing may therefore be achieved by coupling two optical sub-carrier signals at the same carrier wavelength into two orthogonal polarisation states. This may enable an output optical line signal having a dual-polarisation modulation format to be achieved, which may increase the bit rate of an output optical line signal.

In an embodiment, the muxponder comprises a plurality of said multiplexing stages and an optical multiplexer. Each multiplexing stage is arranged to form a dual polarisation optical carrier signal having a different carrier wavelength and carrying respective communications traffic bit streams encoded in the multilevel modulation format. The optical multiplexer is arranged to receive and wavelength multiplex said dual polarisation optical carrier signals. The muxponder may therefore perform wavelength division multiplexing to increase the bit rate of an output optical line signal.

In an embodiment, the optical multiplexer is one of an arrayed waveguide grating and an optical coupler.

In an embodiment, the amplitude modulated tributary optical signals are binary amplitude modulated. In an embodiment, the amplitude modulated tributary optical signals are modulated in an on-off keying, OOK, modulation format. The multilevel modulation format is one of quaternary phase-shift keying, QPSK, and 16-quadrature amplitude modulation, 16-QAM. The muxponder may convert a plurality of OOK modulated tributary optical signals into a QPSK or 16-QAM optical line signal.

In an embodiment, the muxponder additionally comprises an optical signal source for each modulation format conversion apparatus, each optical signal source being arranged to generate and transmit a respective optical carrier signal or optical sub-carrier signal.

In an embodiment, each optical to electrical signal conversion apparatus comprises a photodetector.

A second aspect of the invention provides a communications network node comprising a muxponder comprising modulation format conversion apparatus. The modulation format conversion apparatus comprises first and second inputs, first and second optical to electrical signal conversion apparatus, at least one delay element and an optical IQ modulator. The first and second inputs are each arranged to receive a respective amplitude modulated tributary optical signal carrying a respective communications traffic bit stream. The first and second optical to electrical signal conversion apparatus are each arranged to receive a respective tributary optical signal. Each optical to electrical signal conversion apparatus is arranged to convert the respective tributary optical signal into a corresponding amplitude modulated tributary electrical signal carrying the respective communications traffic bit stream. The at least one delay element is arranged to synchronise the communications traffic bit streams. The optical IQ modulator has an in-phase arm and a quadrature arm. The optical IQ modulator is arranged to receive an optical carrier signal and the tributary electrical signals. Each arm of the optical IQ modulator is arranged to receive a respective one of the tributary electric signal, such that each said tributary electrical signal drives the respective arm of the optical IQ modulator to thereby encode the communications traffic bit streams onto the optical carrier signal in a multilevel modulation format. The communications network node further comprises an optical signal source for the modulation format conversion apparatus. The optical signal source is arranged to generate and transmit a respective optical carrier signal.

By converting the amplitude modulated tributary optical signals into the electrical domain and using the corresponding tributary electrical signals to drive the two arms of the optical IQ modulator use of complex and costly electronic circuitry to perform resampling and time division multiplexing of electrical signals may be avoided. The muxponder may thereby provide the node with a simple architecture for multiplexing low bit rate tributary optical signals into a high bit rate optical line signal for transmission from the node.

In an embodiment, the at least one delay element is an optical delay line provided before the respective optical to electrical signal conversion apparatus. Synchronisation of the traffic bit streams carried by the tributary optical signals may therefore be realised in the optical domain, which may avoid the need for costly, power consuming electronic circuitry to perform the synchronisation.

In an embodiment, the modulation format conversion apparatus further comprises third and fourth inputs, and first and second optical signal combining apparatus. The third and fourth inputs are each arranged to receive a respective said amplitude modulated tributary optical signal. The first optical signal combining apparatus is provided between the first and second inputs and the first optical to electrical signal conversion apparatus. The second optical signal combining apparatus is provided between the third and fourth inputs and the second optical to electrical signal conversion apparatus. Each optical signal combining apparatus is arranged to receive a said tributary optical signal from each respective input and each optical signal combining apparatus is arranged to combine the amplitude modulated tributary optical signals to form a respective tributary optical signal having a four-level modulation format. The muxponder may convert a plurality of amplitude modulated tributary optical signals into an optical line signal having a higher level modulation format, such as 16-quaternary amplitude modulation, 16-QAM.

In an embodiment, the modulation format conversion apparatus comprises a plurality, N, of inputs, and a plurality, N/2, of optical signal combining apparatus. Each input is arranged to receive a respective said amplitude modulated tributary optical signal. The optical signal combining apparatus are arranged in series in a plurality, n, of combining stages, where $2^n=N/2$, between each said optical to electrical signal conversion apparatus and the respective inputs. The muxponder may convert a plurality of amplitude modulated tributary optical signals into an optical line signal having a higher level modulation format, such as 64-QAM.

In an embodiment, each optical signal combining apparatus comprises an optical gain element, an optical delay element and an optical multiplexer. The optical gain element is arranged to receive the amplitude modulated tributary optical signal from one respective input. The optical gain element is arranged to apply an optical gain to the said signal. The optical delay element is arranged to receive the amplitude modulated tributary optical signal from the other respective input. The optical delay element is arranged to apply a delay to the said signal. The optical coupler is arranged to receive the respective amplitude modulated tributary optical signals from the gain element and from the optical delay element and the optical coupler is arranged to combine the said signals to form the respective tributary optical signal having the four-level modulation format. A four level tributary optical signal may be formed by attenuating the amplitude of one of the amplitude modulated tributary optical signals to one half of the amplitude of the other amplitude modulated tributary optical signal.

In an embodiment, the optical gain element is an optical attenuator arranged to apply an attenuation to the amplitude modulated tributary optical signal. The optical delay element is an optical delay line. The optical multiplexer is an optical coupler.

In an embodiment, the muxponder further comprises first and second overhead insertion apparatus. Each overhead insertion apparatus is provided between the respective optical to electrical signal conversion apparatus and the optical modulator. Each overhead insertion apparatus is arranged to insert respective overhead bits into the communications traffic bit stream of the respective tributary electrical signal. Inserting the overhead into the communications traffic bit streams carried by the tributary electrical signals may enable the overhead to be inserted using low speed electronics.

In an embodiment, the muxponder comprises a multiplexing stage. The multiplexing stage comprises first and second said modulation format conversion apparatus and a polarisation beam combiner. The optical IQ modulator of the first modulation format conversion apparatus is arranged to receive a first optical sub-carrier signal having a carrier wavelength and a first polarisation state. The optical IQ modulator of the second modulation format conversion apparatus is arranged to receive a second optical sub-carrier signal having the carrier wavelength and a second polarisation state. The polarisation beam combiner is arranged to receive the first and second optical sub-carrier signals from the optical modulator. The polarisation beam combiner is arranged to polarisation multiplex the first and second optical sub-carrier signals to form a dual polarisation optical carrier signal having the carrier wavelength and carrying the communications traffic bit streams encoded in the multilevel modulation format. Polarisation multiplexing may therefore be achieved by coupling two optical sub-carrier signals at the same carrier wavelength into two orthogonal polarisation states. This may enable an output optical line signal having a dual-polarisation modulation format to be achieved, which may increase the bit rate of an output optical line signal.

In an embodiment, the muxponder comprises a plurality of said multiplexing stages and an optical multiplexer. Each multiplexing stage is arranged to form a dual polarisation optical carrier signal having a different carrier wavelength and carrying respective communications traffic bit streams encoded in the multilevel modulation format. The optical multiplexer is arranged to receive and wavelength multiplex said dual polarisation optical carrier signals.

In an embodiment, the optical multiplexer is one of an arrayed waveguide grating and an optical coupler.

In an embodiment, the amplitude modulated tributary optical signals are binary amplitude modulated. In an embodiment, the amplitude modulated tributary optical signals are modulated in an on-off keying, OOK, modulation format. The multilevel modulation format is one of quaternary phase-shift keying, QPSK, and 16-quadrature amplitude modulation, 16-QAM. The muxponder may convert a plurality of OOK modulated tributary optical signals into a QPSK or 16-QAM optical line signal.

In an embodiment, the communications network node comprises an optical signal source for each modulation format conversion apparatus, each optical signal source being arranged to generate and transmit a respective optical carrier signal or optical sub-carrier signal.

In an embodiment, the muxponder additionally comprises an optical signal source for each modulation format conversion apparatus, each optical signal source being arranged to generate and transmit a respective optical carrier signal or optical sub-carrier signal.

In an embodiment, each optical to electrical signal conversion apparatus comprises a photodetector.

A third aspect of the invention provides a method of converting a plurality of tributary optical communications signals having a first bit rate into an optical line signal having a second, higher bit rate. The method comprises step a. of receiving a set of tributary optical signals. The set comprises first and second amplitude modulated tributary optical signals each carrying a respective communications traffic bit stream. The method comprises step b. of converting each amplitude modulated tributary optical signal into a corresponding amplitude modulated tributary electrical signal carrying the respective communications traffic bit stream. The method comprises step c. of synchronising the communications traffic bit streams. The method comprises step d. of receiving an optical carrier signal at an optical IQ modulator having an in-phase arm and a quadrature arm. Step d. comprises driving each said arm with a respective one of the tributary electrical signals to thereby encode the communications traffic bit streams onto the optical carrier signal in a multilevel modulation format.

By converting the amplitude modulated tributary optical signals into the electrical domain and using the corresponding tributary electrical signals to drive the two arms of the optical IQ modulator use of complex and costly electronic circuitry to perform resampling and time division multiplexing of electrical signals may be avoided.

In an embodiment, step c. comprises applying a delay to at least one of the tributary optical signals to synchronise the communications traffic bit streams. Synchronisation of the traffic bit streams carried by the tributary optical signals may therefore be realised in the optical domain, which may avoid the need for costly, power consuming electronic circuitry to perform the synchronisation.

In an embodiment, step a. comprises receiving a set of tributary optical signals, the set comprising first, second, third and fourth amplitude modulated tributary optical signals each carrying a respective communications traffic bit stream. The first and second amplitude modulated tributary optical signals are combined to form a first combined tributary optical signal having a four-level modulation format. The third and fourth amplitude modulated tributary optical signals are combined to form a second combined tributary optical signal having said four-level modulation format. Step b. additionally comprises converting each combined tributary optical signal into a corresponding tributary electrical signal. A plurality of amplitude modulated tributary optical signals may be converted into an optical line signal having a higher level modulation format, such as 16-quaternary amplitude modulation, 16-QAM.

In an embodiment, the amplitude of one of the first and second said signals is changed before the first and second said signals are combined and the amplitude of one of the third and fourth said signals is changed before the third and fourth said signals are combined. A delay is applied to the other of the first and second said signals before the first and second said signals are combined and a delay is applied to the other of the third and fourth said signals before the third and fourth said signals are combined. A four level tributary optical signal may be formed by attenuating the amplitude of one of the amplitude modulated tributary optical signals to one half of the amplitude of the other amplitude modulated tributary optical signal.

In an embodiment, the amplitude of one of the first and second said signals is reduced before the first and second said signals are combined and the amplitude of one of the third and fourth said signals is reduced before the third and fourth said signals are combined.

In an embodiment, the set of tributary optical signals comprises a plurality, N, of amplitude modulated tributary optical signals. Step a. comprises combining the tributary optical signals in a plurality, n, of combining steps, wherein $2^n=N/2$. Each combining step comprises combining two tributary optical signals each having an M-level modulation format into a combined tributary optical signal having a 2M-level modulation format.

In an embodiment, the method further comprises inserting respective overhead bits into the communications traffic bit stream of each tributary electrical signal. Inserting the overhead into the communications traffic bit streams carried by the tributary electrical signals may enable the overhead to be inserted using low speed electronics.

In an embodiment, step a. comprises receiving a first said set of tributary optical signals and a second said set of tributary optical signals. Step d. comprises receiving a first optical sub-carrier signal at a first optical IQ modulator having an in-phase arm and a quadrature arm. Each said arm of the first optical IQ modulator is driven with a respective one of the tributary electrical signals of said first set to thereby encode the communications traffic bit streams of the first set onto the first optical sub-carrier signal in a multilevel modulation format. The first optical sub-carrier signal has a carrier wavelength and a first polarization state. Step d. additionally comprises receiving a second optical sub-carrier signal at a second optical IQ modulator having an in-phase arm and a quadrature arm. Each said arm of the second optical IQ modulator is driven with a respective one of the tributary electrical signals of said second set to thereby encode the communications traffic bit streams of the second set onto a second optical sub-carrier signal in the multilevel modulation format. The second optical sub-carrier signal has the carrier wavelength and a second polarization state. The method further comprises polarization multiplexing the first and second optical sub-carrier signals to form a dual polarisation optical carrier signal having the carrier wavelength and carrying the communications traffic bit streams encoded in the multilevel modulation format. Polarisation multiplexing may therefore be achieved by coupling two optical sub-carrier signals at the same carrier wavelength into two orthogonal polarisation states. This may enable an output optical line signal having a dual-polarisation modulation format to be achieved, which may increase the bit rate of an output optical line signal.

In an embodiment, the method comprises receiving a plurality of said sets of amplitude modulated tributary optical signals. The sets are arranged into pairs, each pair comprising a said first set and a said second set. Steps a. to d. are carried out for each pair of sets of tributary optical signals, the optical carrier wavelength being different for each pair. The dual polarization optical carrier signals are wavelength multiplexed. Wavelength division multiplexing may be performed to increase the bit rate of an output optical line signal.

In an embodiment, the amplitude modulated tributary optical signals are binary amplitude modulated. In an embodiment, the amplitude modulated tributary optical signals are modulated in an on-off keying, OOK, modulation format. The multilevel modulation format is one of quaternary phase-shift keying, QPSK, and 16-quadrature amplitude modulation, 16-QAM. The method may convert a plurality of OOK modulated tributary optical signals into a QPSK or 16-QAM optical line signal.

A fourth aspect of the invention provides a data carrier having computer readable instructions embodied therein. The said computer readable instructions are for providing access to resources available on a processor. The computer readable instructions comprise instructions to cause the processor to perform any of the above steps of the method of converting a plurality of tributary optical communications signals having a first bit rate into an optical line signal having a second, higher bit rate.

In an embodiment, the data carrier is a non-transitory data carrier.

Embodiments of the invention will now be described, by way of example only, with reference to the accompanying drawings.

DETAILED DESCRIPTION

Figure 1:
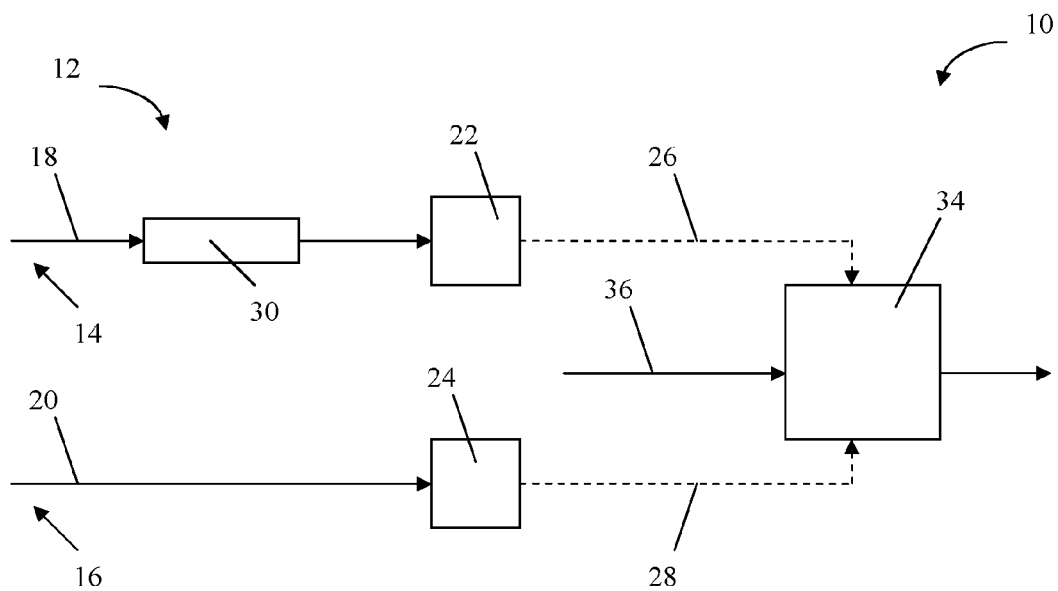
FIG. 1 is a schematic representation of a muxponder according to a first embodiment of the invention.

A first embodiment of the invention provides a muxponder 10 comprising modulation format conversion apparatus 12, which comprises a first input 14, a second input 16, first optical to electrical (O-E) signal conversion apparatus 22 and second O-E signal conversion apparatus 24, a delay element 30 and an optical IQ modulator 34.

Each of the inputs 14, 16 are arranged to receive a respective amplitude modulated tributary optical signal 18, 20 carrying a respective communications traffic bit stream. The first and second O-E signal conversion apparatus 22, 24 are each arranged to convert a respective one of the tributary optical signals into a corresponding amplitude modulated tributary electrical signal 26, 28 carrying the respective communications traffic bit stream.

The delay element 30 is arranged to synchronise the communications traffic bit streams. In this embodiment, the delay element 30 is provided before the first O-E signal conversion apparatus 22, in the optical domain, and is arranged to apply a delay to one of the tributary optical signals 18, as necessary, to synchronise the communications traffic bit streams.

The optical IQ modulator 34 is arranged to receive an optical carrier signal 36 and each of the tributary electrical signals 26, 28. The optical IQ modulator has an in-phase arm and a quadrature arm (not shown). Each arm of the modulator is arranged to receive a respective one of the tributary electrical signals. Each tributary electrical signal 26, 28 drives a respective arm of the optical IQ modulator 34 to thereby encode the communications traffic bit streams carried by the tributary electrical signals onto the optical carrier signal in a multi-level modulation format.

The structure and operation of an optical IQ modulator 34 will be well known to persons skilled in the art but for completeness a brief description is included here; further details may be found in "High Spectral Density Optical Communication Technologies", by Masataka Nakazawa. An optical IQ modulator has an in-phase, I, arm and a quadrature arm, Q, each of which typically comprise a Mach-Zehnder modulator, MZM. One arm, typically the quadrature arm, also comprises a phase-shifter arranged to apply a relative phase shift of $\pi/2$. Incoming light is equally split between the two arms of the IQ modulator, and in each arm an amplitude modulation is performed by the respective MZM. An additional phase shift of $\pi/2$ is applied in one arm. The optical signals from the two arms are then recombined.

Figure 2:
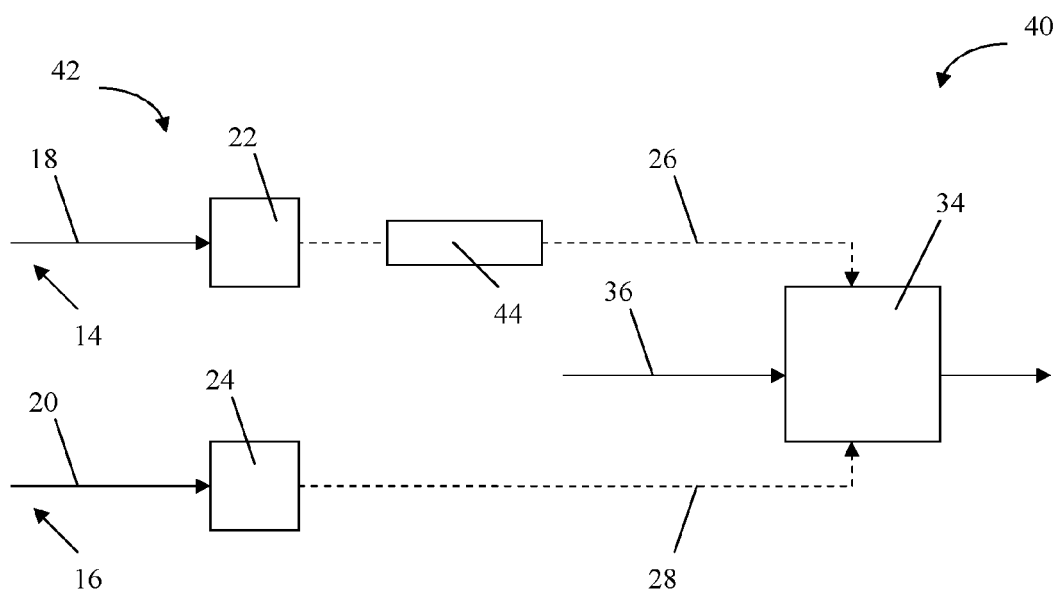
FIG. 2 is a schematic representation of a muxponder according to a second embodiment of the invention.

A muxponder 40 according to a second embodiment of the invention is shown in FIG. 2. The muxponder 40 of this embodiment is similar to the muxponder 10 of FIG. 1 with the following modifications. The same reference numbers are retained for corresponding features.

In the embodiment the muxponder 40 comprises modulation format conversion apparatus 42 in which the delay element 44 is provided after the first O-E signal conversion apparatus 22, in the electrical domain, and is arranged to apply a delay to one of the tributary electrical signals 26, as necessary, to synchronise the communications traffic bit streams.

Figure 3:
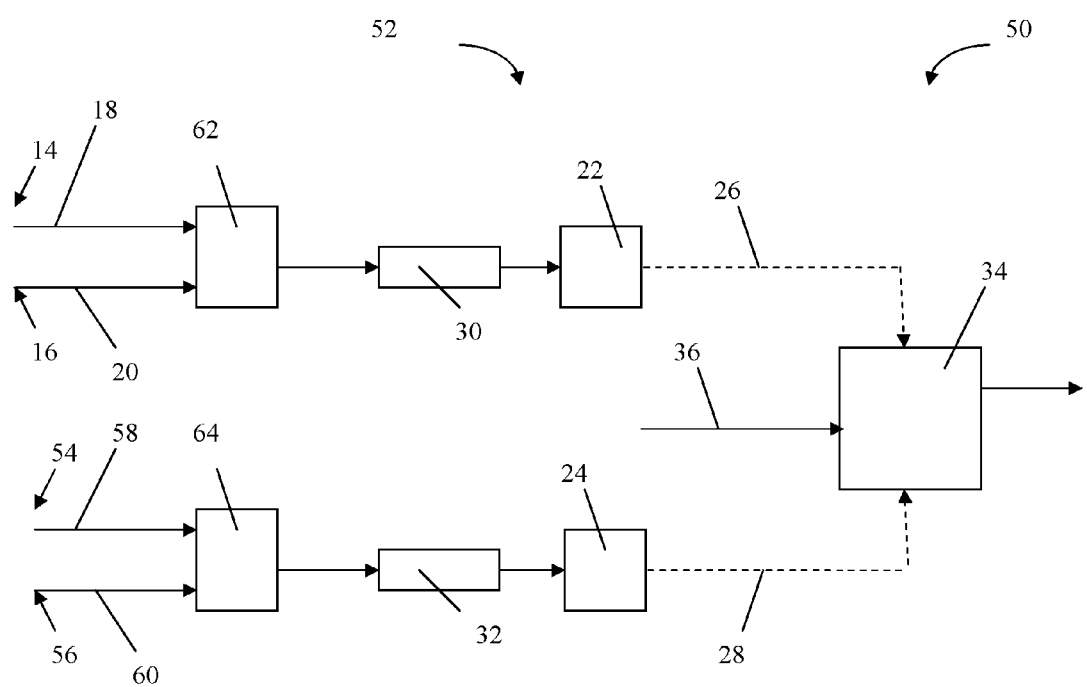
FIG. 3 is a schematic representation of a muxponder according to a third embodiment of the invention.

FIG. 3 shows a muxponder 50 according to a third embodiment of the invention. The muxponder 50 of this embodiment is similar to the muxponder 10 of FIG. 1, with the following modifications. The same reference numbers are retained for corresponding features.

In this embodiment, the muxponder 50 comprises modulation format conversion apparatus 52 having a respective delay element 30, 32 provided before each O-E signal conversion apparatus 22, 24. In this embodiment, each delay element is an optical delay line.

The modulation format conversion apparatus 52 further comprises a third input 54 and a fourth input 56. Each input is arranged to receive a respective amplitude modulated tributary optical signal 58, 60 carrying respective communications traffic bit streams. The modulation format conversion apparatus 52 also comprises first optical signal combining apparatus 62 and second optical signal combining apparatus 64. The first optical signal combining apparatus 62 is provided between the first and second inputs 14, 16 and the first optical delay line 30. The second optical signal combining apparatus 64 is provided between the third and fourth inputs 54, 56 and the second optical delay line 32. Each of the optical signal combining apparatus 62, 64 is arranged to receive a tributary optical signal 18, 20, 58, 60 from each respective input 14, 16, 54, 56. Each optical signal combining apparatus is arranged to combine the respective two amplitude modulated tributary optical signals to form a respective tributary optical signal having a four-level modulation format. The two resulting four-level modulated tributary optical signals are transmitted to their respective optical delay lines 30, 32 and the respective O-E signal conversion apparatus 22, 24.

The muxponder 50 is therefore able to convert four amplitude modulated tributary optical signals, each having a first bit rate, into an output optical line signal having a higher level modulation format, which in the is example is 16-QAM, and a higher bit rate.

Figure 4:
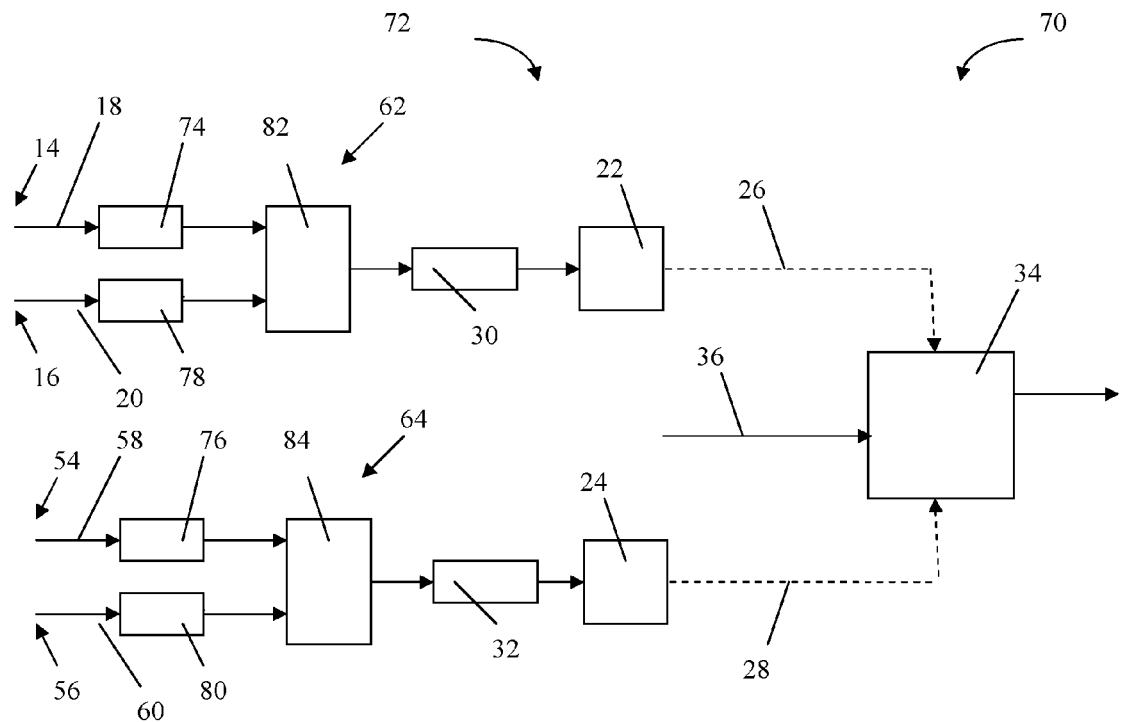
FIG. 4 is a schematic representation of a muxponder according to a fourth embodiment of the invention.

A muxponder 70 according to a fourth embodiment of the invention is shown in FIG. 4. The muxponder 70 of this embodiment is similar to the muxponder 50 shown in FIG. 3 with the following modifications. The same reference numbers are retained for corresponding features.

In this embodiment, each of the first and second optical signal combining apparatus 62, 64 comprises an optical gain element 74, 76, an optical delay element 78, 80, and an optical multiplexer 82, 84. In this example the optical delay elements are optical delay lines 74, 76 and the optical gain elements are variable optical attenuators (VOA) 78, 80. Each optical multiplexer 82, 84 is a 1:2 optical coupler.

The VOAs 74, 76 are arranged to attenuate the amplitude of the input tributary optical signals 18, 58 to one half of the amplitude of the other tributary optical signals 20, 60. Each optical delay line 78, 80 is arranged to apply a delay to the respective tributary optical signal 20, 60, as necessary, in order to synchronise the communications traffic bit streams carried by each of the tributary optical signals. The optical couplers 82, 84 combine the amplitude adjusted tributary optical signals 18, 58 with their respective other tributary optical signal 20, 60 to form respective four-level modulated tributary optical signals, which are delivered to the respective delay lines 30, 32 and O-E signal conversion apparatus 22, 24.

Figure 5:
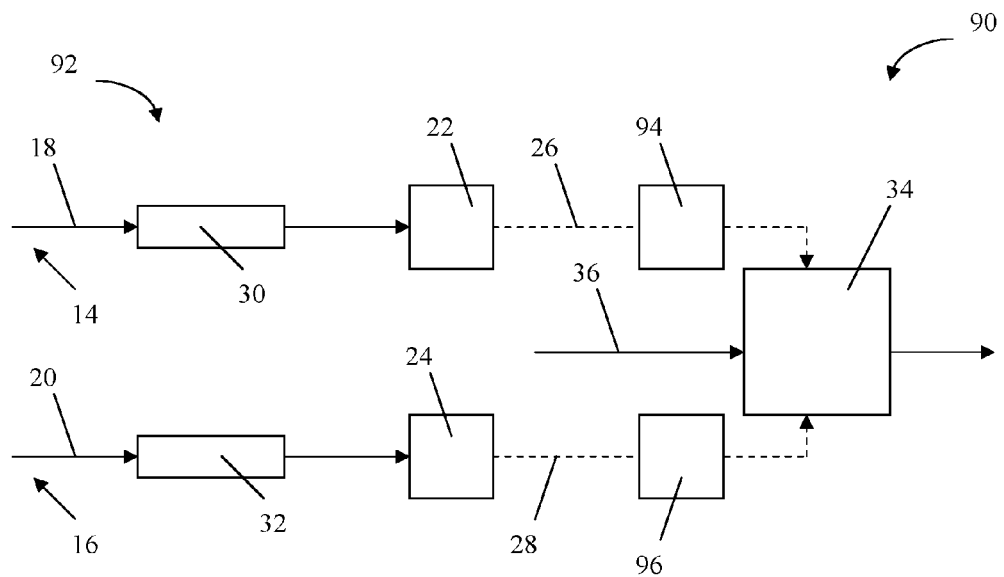
FIG. 5 is a schematic representation of a muxponder according to a fifth embodiment of the invention.

A muxponder 90 according to a fifth embodiment of the invention as shown in FIG. 5. The muxponder 90 of this embodiment is similar to the muxponder 10 shown in FIG. 1 with the following modifications. The same reference numbers are retained for corresponding features.

In this embodiment, two optical delay lines 30, 32 are provided within the modulation format conversion apparatus 92. The muxponder 90 additionally comprises a first overhead insertion apparatus 94 and a second overhead insertion apparatus 96. The first overhead insertion apparatus 94 is provided between the first O-E signal conversion apparatus 22 and the input to a first arm of the optical IQ modulator 34. The second overhead insertion apparatus 96 is provided between the second O-E signal conversion apparatus 24 and the input to a second arm of the optical IQ modulator. Each overhead insertion apparatus 94, 96 is arranged to insert respective overhead bits into the communication traffic bit stream of the respective tributary electrical signal 26, 28.

Figure 6:
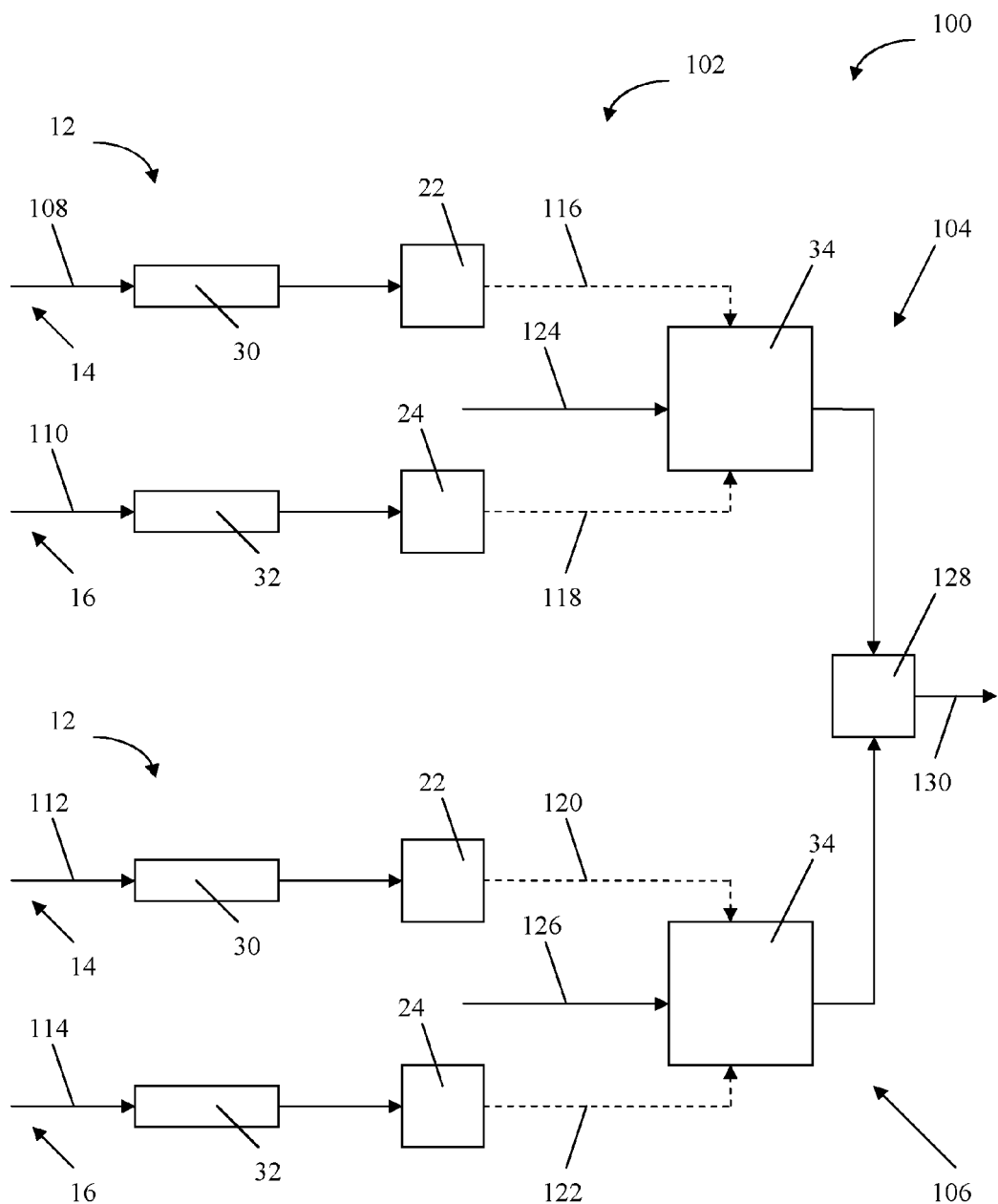
FIG. 6 is a schematic representation of a muxponder according to a sixth embodiment of the invention.

FIG. 6 shows a muxponder 100 according to a sixth embodiment of the invention. The muxponder 100 of this embodiment is similar to the muxponder 10 shown in FIG. 1, with the following modifications. The same reference numbers are retained for corresponding features.

The muxponder 100 comprises a multiplexing stage 102 which comprises a first modulation format conversion apparatus 104 and a second modulation format conversion apparatus 106. Each modulation format conversion apparatus is similar to the modulation format apparatus 12 shown in FIG. 1, but includes an optical delay line 30, 32 before each O-E signal conversion apparatus 22, 24.

The optical IQ modulator 34 of the first modulation format conversion apparatus 104 is arranged to receive a first optical sub-carrier signal 124. The first optical sub-carrier signal has a carrier wavelength and a first polarisation state. The optical IQ modulator 34 of the second modulation format conversion apparatus 106 is arranged to receive a second optical sub-carrier signal 126. The second optical sub-carrier signal has the same carrier wavelength and a second, orthogonal polarisation state.

The multiplexing stage 102 further comprises a polarisation beam combiner 128 which is arranged to receive the first and second optical sub-carrier signals from the optical modulators 34 of each of the modulation format conversion apparatus 104, 106. The polarisation beam combiner is arranged to polarisation multiplex the first and second sub-carrier signals to form a dual polarisation optical carrier signal 130. The optical carrier signal 130 has the same carrier wavelength as the optical carrier signals and carries the communications traffic bit streams of the tributary optical signals 108, 110, 112, 114 encoded in a multi-level modulation format which in this example is QPSK.

Figure 7:
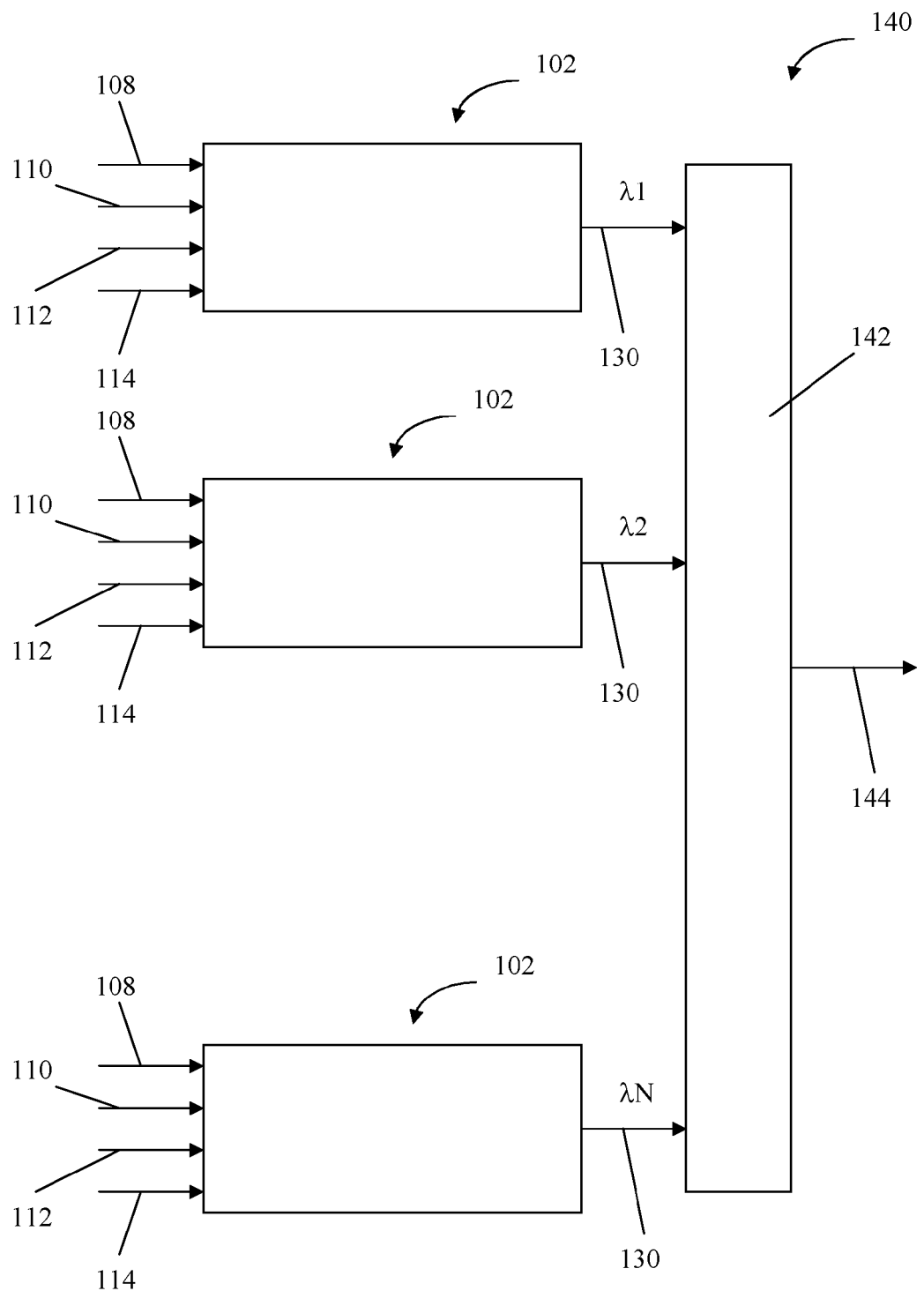
FIG. 7 is a schematic representation of a muxponder according to a seventh embodiment of the invention.

A muxponder 14 according to a seventh embodiment of the invention is shown in FIG. 7. The muxponder 140 of this embodiment is similar to the muxponder 100 shown in FIG. 6 with the following modifications. The same reference numbers are retained for corresponding features.

The muxponder 140 of this embodiment comprises a plurality, N, of multiplexing stages 102. Each multiplexing stage 102 is arranged to form a dual polarisation optical carrier signal 130 carrying the respective communications traffic bit streams of its respective input tributary optical signals 108, 110, 112, 114 encoded in a multi-level modulation format. Each optical carrier signal 130 is therefore dual polarisation, DP, QPSK modulated. Each optical carrier signal 130 has a different carrier wavelength, λ1 to λN.

The muxponder 140 additional comprises an optical multiplexer 142, which takes the form of an arrayed waveguide grating in this example, which is arranged to receive each of the DP-QPSK modulated optical carrier signals 130 and to wavelength multiplex the optical carrier signals to form an output optical line signal 144.

Figure 8:
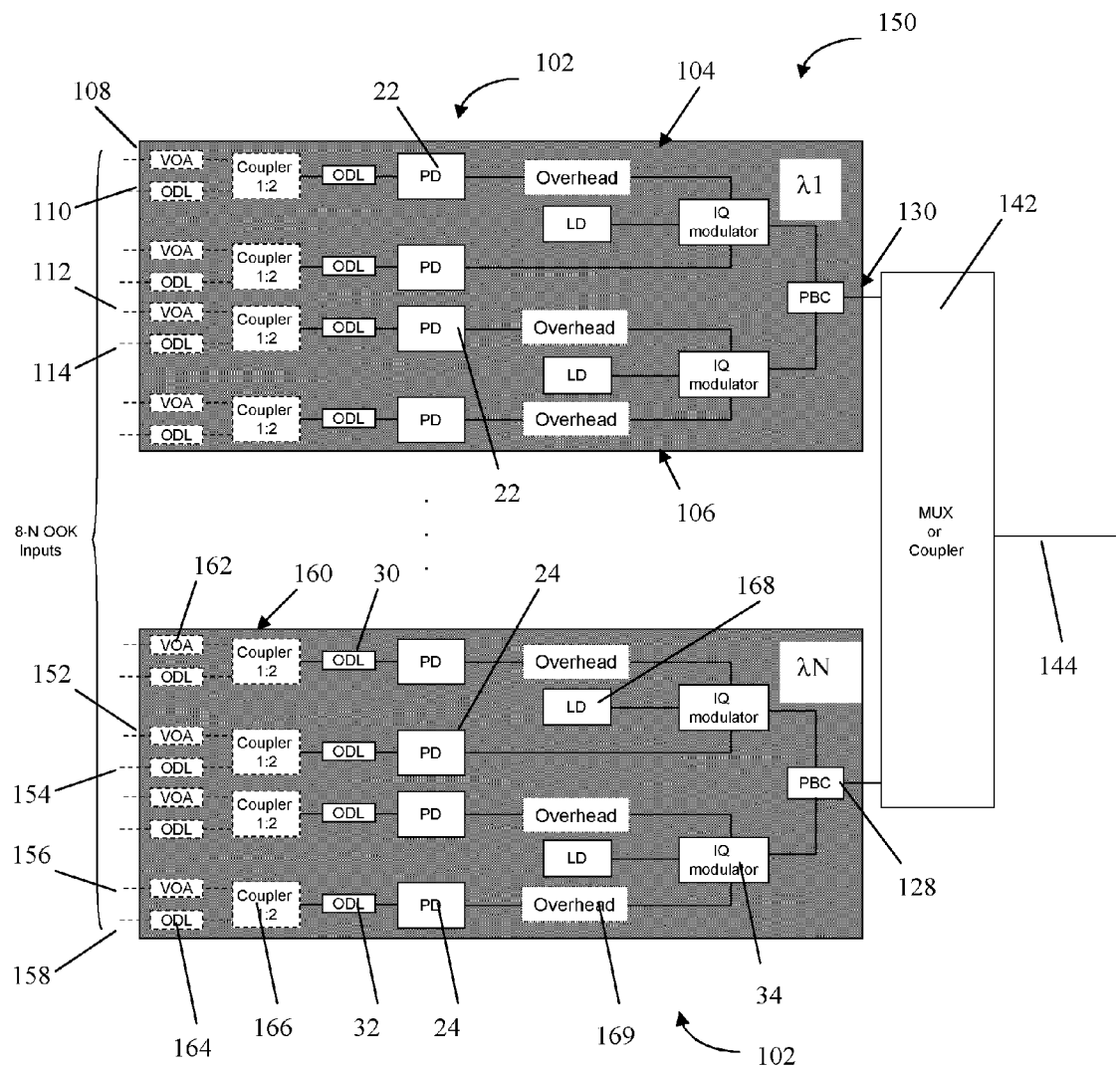
FIG. 8 is a schematic representation of a muxponder according to an eighth embodiment of the invention.
Figure 9:
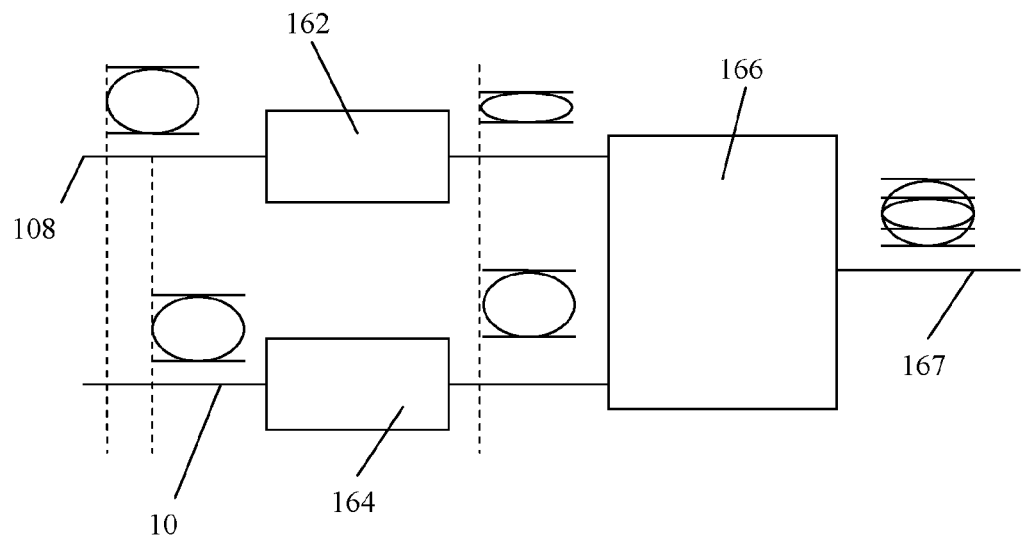
FIG. 9 is a schematic representation of optical signal combining apparatus of the muxponder of FIG. 8, showing how a four-level signal is formed by combining two optical binary modulated signals.

Referring to FIGS. 8 and 9, an eighth embodiment of the invention provides a muxponder 150 which is similar to the muxponder 140 shown in FIG. 7 with the following modifications. The same reference numbers are retained for corresponding features.

In this embodiment each multiplexing stage 102 has eight inputs 108, 110, 112, 114, 152, 154, 156, 158. Each modulation format conversion apparatus 104, 106 of each of the multiplexing stages 102 comprises optical signal combining apparatus 160. Each optical signal combining apparatus 160 is provided between a pair of inputs 108, 114, 152, 158 and the respective optical delay line 30, 32. Each optical signal combining apparatus 160 comprises a VOA 162, an optical delay line 164 and an optical coupler 166.

The optical signal combining apparatus 160 is shown in more detail in FIG. 9. Amplitude modulated tributary optical signals are received at the inputs 108, 110. The tributary optical signal received at the first input 108 is passed to the VOA 162 which is arranged to reduce the amplitude of the tributary optical signal to one half of the amplitude of the tributary optical signal received at the other input 110. The optical delay line 164 applies a delay to the tributary optical signal received at the second input 110 so that the tributary signals leaving the VOA 162 and the optical delay line 164 are synchronised with one another. The tributary optical signals are received by the optical coupler 166 which combines them to form a four-level tributary optical signal 167.

In this embodiment each multiplexing stage 102 additionally comprises an optical signal source in the form of a laser diode 168, which is arranged to generate an optical sub-carrier signal for the respective optical IQ modulator 34. Each multiplexing stage 102 also comprises overhead insertion apparatus 169 arranged to insert overhead bits into the communications traffic bit streams of the tributary electrical signals.

The muxponder 150 may be operated to convert a plurality of binary amplitude modulated tributary optical signals having a first bit rate into an output optical line signal 144. The binary amplitude modulated tributary optical signals have an on-off keying, OOK, modulation format and the output optical line signal has a QPSK or 16-QAM modulation format and a higher bit rate. Where a 16-QAM optical line signal 144 is desired, OOK tributary optical signals are delivered to each of the inputs 108 to 114, 152 to 158. Where a QPSK optical line signal 144 is required, OOK tributary optical signals are delivered to one input 108, 112, 152, 156 of each optical signal combining apparatus 160 of each multiplexing stage 102. The VOAs 162 are arranged to apply no attenuation to the OOK tributary optical signals.

The bit rate of the optical line signal 144 output from the muxponder 150 is calculated as follows, where R is the bit rate of each OOK input tributary optical signal and N is the number of multiplexing stages 102, and thus the number of output dual polarisation, DP, optical carrier signals 130.

In one mode of operation, in which OOK tributary optical signals are converted into a 16-QAM optical line signal, the muxponder 150 receives 8*N tributary optical signals from a corresponding number of inputs 108-114, 152-158. The muxponder 150 generates a single output optical line signal 144 composed of N dual polarisation optical carrier signals 130. The aggregate bit rate of the output optical line signal 144 is therefore 8*N*R. As each carrier is DP-16 QAM modulated, the bit rate per optical carrier signal is 8*R and the baud rate per optical carrier signal is R. The overhead has been neglected in this example for simplicity.

In a second mode of operation, in which OOK tributary optical signals are converted into a QPSK optical line signal, the muxponder 150 receives 4*N OOK tributary optical signals. The muxponder 150 generates a single output optical line signal 144 composed of N optical carrier signals 130, and the aggregate bit rate of the output optical line signal is therefore 4*N*R. Each carrier is DP-QPSK modulated, therefore the bit rate per optical carrier signal is 4*R and the baud rate per optical carrier signal is R. The overhead has again been neglected for sake of simplicity.

The baud rate is an important parameter because it is fixed by the bandwidth limitations of the electronic receivers which are to receive the optical line signal. Assuming a sampling rate at the receiver which is acceptably lower than the Nyquist theoretical limit, a practical value of the bandwidth is about 1.2 times the baud rate. The bandwidth of opto-electronics devices which may be used for optical communications signals having a bit rate of 100 Gbit/s is about 28 GHz. It is highly desirable to be able to use existing deployed communications infrastructure at higher bit-rates, to maximize revenues, reduce development costs and increase sales volumes.

The muxponder 150 may be used to convert OOK tributary optical signals having a range of bit rates, R, into a DP-16-QAM optical line signal 144, as follows:

1. Input bit rate, R=25 Gbit/s; number of optical carriers (number of multiplexing stages) N=2; Output baud rate=R=25 Gbaud; Output aggregate bit rate=8*N*R=400 Gbit/s 2. R=12.5 Gbit/s; N=1; Output baud rate=R=12.5 Gbaud; Output aggregate bit rate=8*N*R=100 Gbit/s Example 1 illustrated that the muxponder 150 may be used to implement a 400 Gbit/s muxponder compatible with the electronics developed for 100 Gbit/s. Similarly, example 2 illustrates how the muxponder 150 may be used to implement a 100 Gbit/s muxponder compatible with the electronics developed for 10 Gbit/s optical interfaces that are widely available on the market at a low cost.

The muxponder 150 may also be used to convert OOK tributary optical signals having a range of bit rates, R, into a QPSK optical line signal 144, as follows:

3. R=25 Gbit/s; N=2; Output baud rate=R=25 Gbaud; Output aggregate bit rate=4*N*R=200 Gbit/s 4. R=50 Gbit/s; N=5; Output baud rate=R=50 Gbaud; Output aggregate bit rate=4*N*R=1 Tbit/s.

Example 3 is similar to example 1 but QPSK is used to increase the link distance, but at the cost of a lower aggregate bit rate of the optical line signal. Example 4 illustrates how the muxponder 150 may be used to transmit 1 Terabit/s by generating a superchannel optical line signal 144 composed of 5 optical carrier signals 130.

Figure 10:
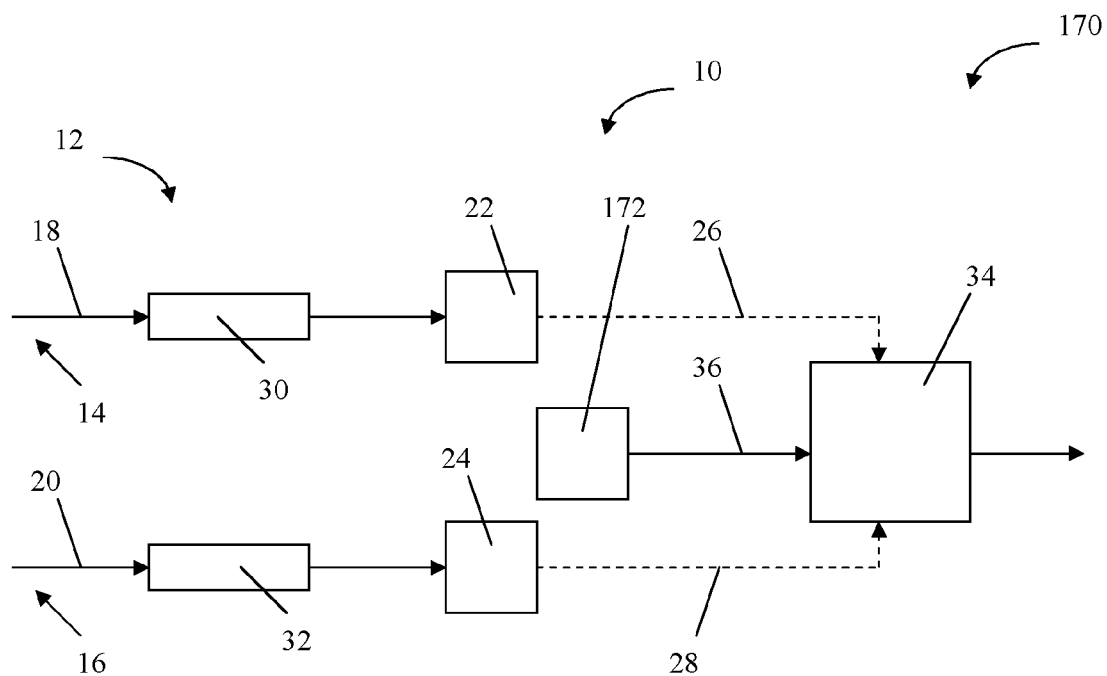
FIG. 10 is a schematic representation of a muxponder according to a ninth embodiment of the invention.

A ninth embodiment of the invention provides a communications network node 170, as shown in FIG. 10. The node 170 comprises a muxponder 10, as shown in FIG. 1, and an optical signal source 172. The optical signal source 172 is arranged to generate and transmit an optical carrier signal 36.

Figure 11:
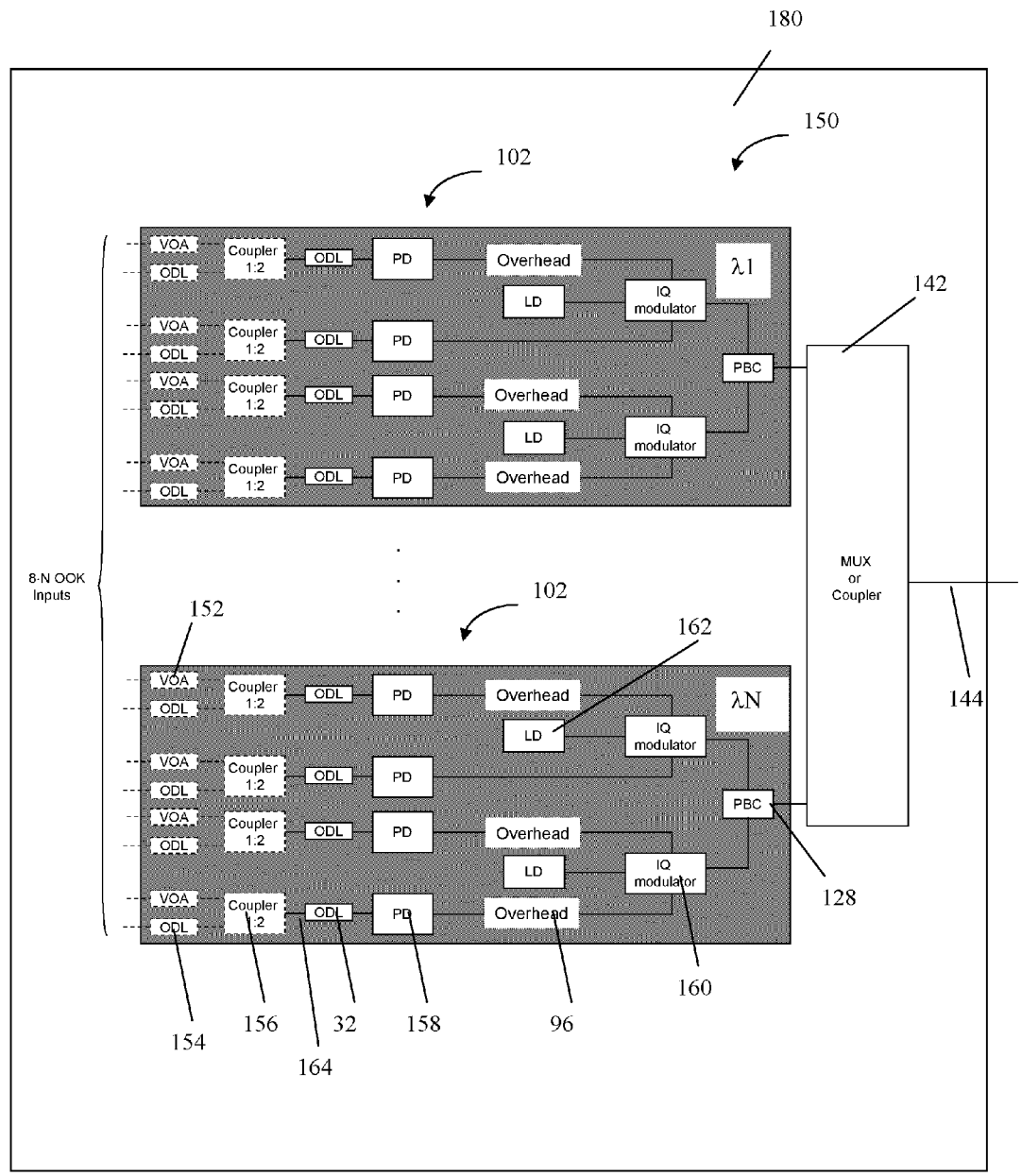
FIG. 11 is a schematic representation of a communications network node according to a tenth embodiment of the invention.

A tenth embodiment of the invention provides a communications network node 180, as shown in FIG. 11. The node 180 comprises a muxponder 150 as shown in FIG. 8.

Figure 12:
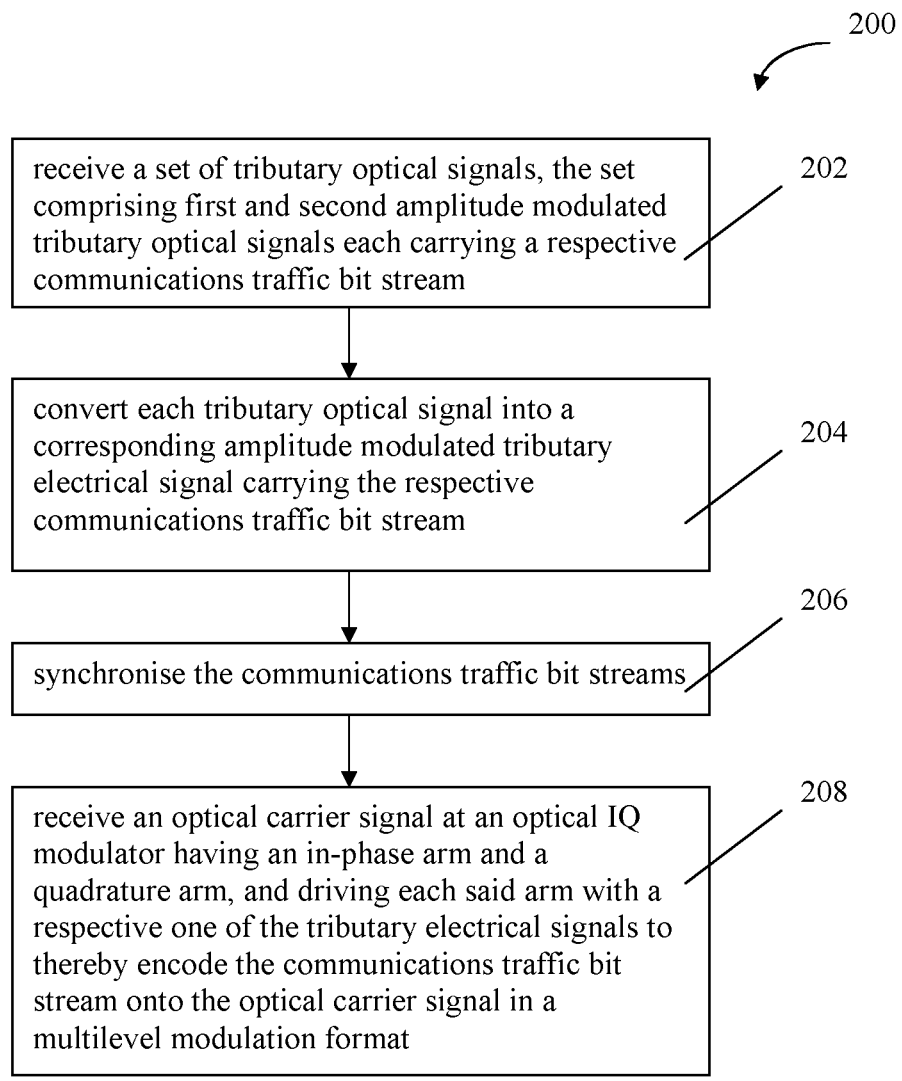
FIG. 12 shows the steps of a method according to an eleventh embodiment of the invention of converting a plurality of tributary optical communications signals having a first bit rate into an optical line signal having a second, higher bit rate.

The steps of a method 200 according to an eleventh embodiment of the invention are shown in FIG. 12. This embodiment provides a method 200 of converting a plurality of tributary optical communications signals having a first bit rate into an optical line signal having a second, higher bit rate.

The method 200 comprises:
a. receiving a set of tributary optical signals, the set comprising first and second amplitude modulated tributary optical signals each carrying a respective communications traffic bit stream 202;
b. converting each amplitude modulated tributary optical signal into a corresponding amplitude modulated tributary electrical signal carrying the respective communications traffic bit stream 204;
c. synchronising the communications traffic bit streams 206; and
d. receiving an optical carrier signal at an optical IQ modulator having an in-phase arm and a quadrature arm, and driving each said arm with a respective one of the tributary electrical signals to thereby encode the communications traffic bit streams onto the optical carrier signal in a multilevel modulation format 208.

Figure 13:
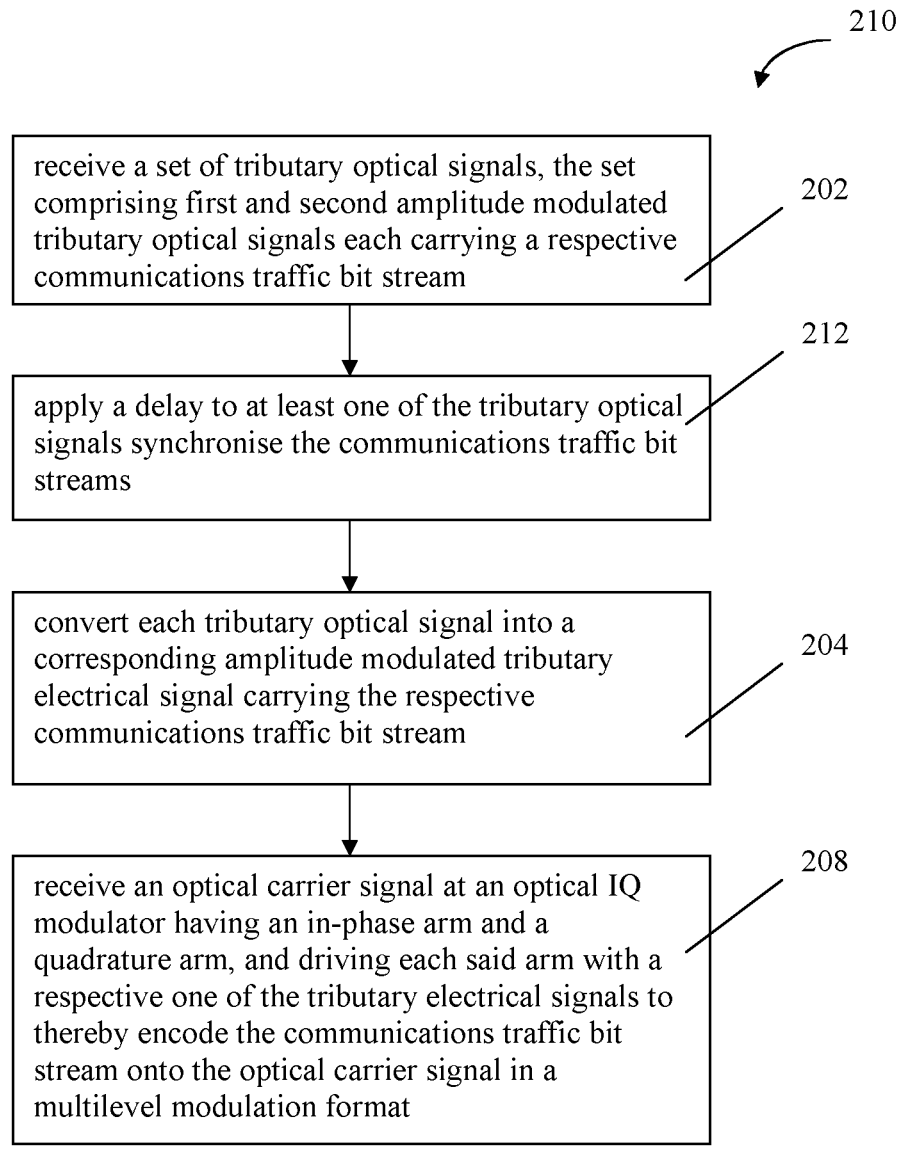
FIG. 13 shows the steps of a method according to a twelfth embodiment of the invention of converting a plurality of tributary optical communications signals having a first bit rate into an optical line signal having a second, higher bit rate.

A twelfth embodiment of the invention provides a method 210 of converting a plurality of tributary optical communications signals having a first bit rate into an optical line signal having a second, higher bit rate. The steps of the method 210, shown in FIG. 13, are similar to the steps of the method 200 shown in FIG. 12, with the following modifications. The same reference numbers are retained for corresponding steps.

In this embodiment, step c. comprises applying a delay to at least one of the tributary optical signals synchronise the communications traffic bit streams 212.

Figure 14:
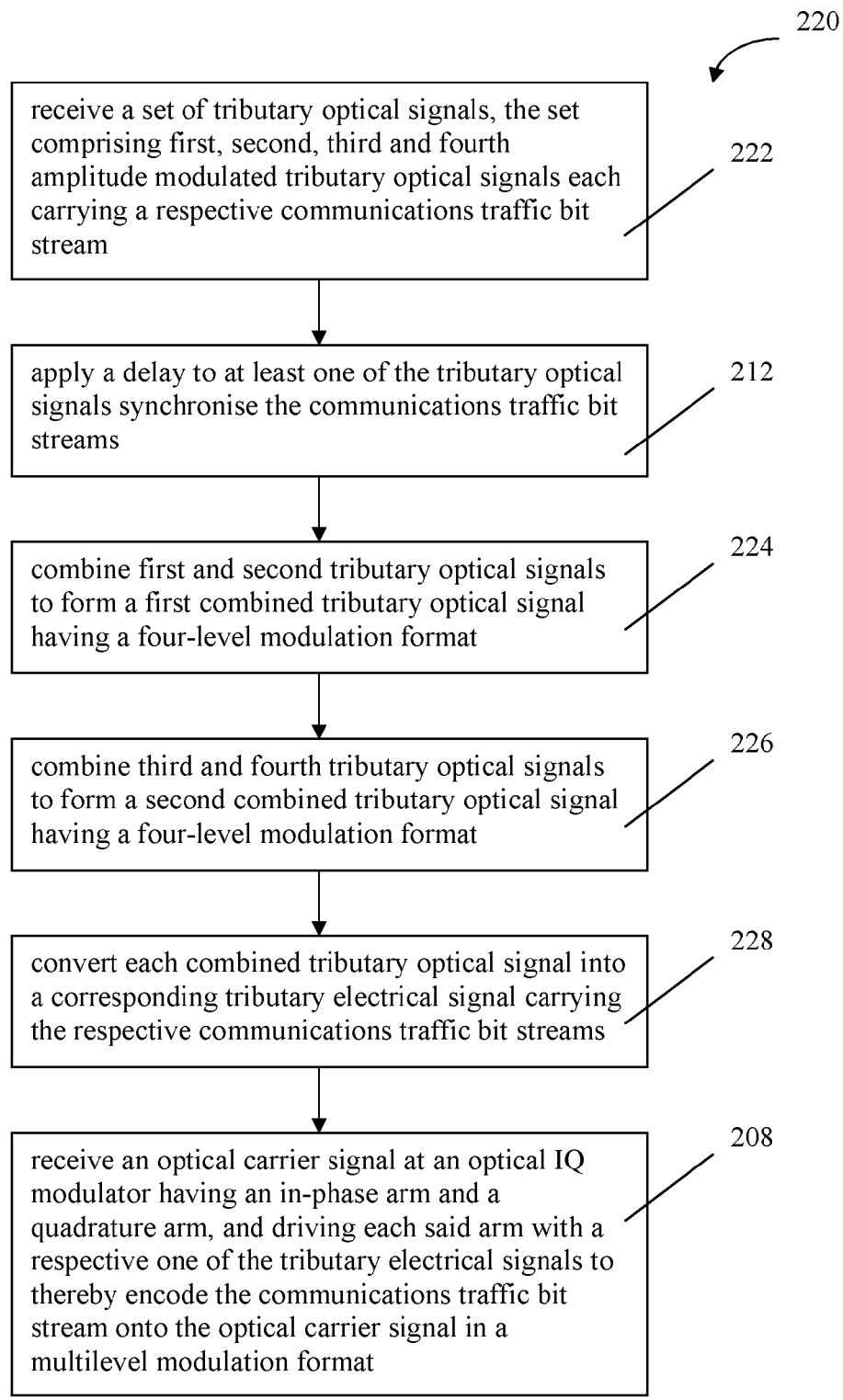
FIG. 14 shows the steps of a method according to a thirteenth embodiment of the invention of converting a plurality of tributary optical communications signals having a first bit rate into an optical line signal having a second, higher bit rate.

A thirteenth embodiment of the invention provides a method 220 of converting a plurality of tributary optical communications signals having a first bit rate into an optical line signal having a second, higher bit rate. The steps of the method 220, shown in FIG. 14, are similar to the steps of the method 210 shown in FIG. 13, with the following modifications. The same reference numbers are retained for corresponding steps.

In this embodiment, step a. comprises receiving a set of tributary optical signals, the set comprising first, second, third and fourth amplitude modulated tributary optical signals each carrying a respective communications traffic bit stream 222. Step a. further comprises combining the first and second amplitude modulated tributary optical signals to form a first combined tributary optical signal having a four-level modulation format 224, and combining the third and fourth amplitude modulated tributary optical signals to form a second combined tributary optical signal having said four-level modulation format 226.

Step b. comprises converting each combined tributary optical signal into a corresponding tributary electrical signal carrying the respective communications traffic bit streams 228.

Figure 15:
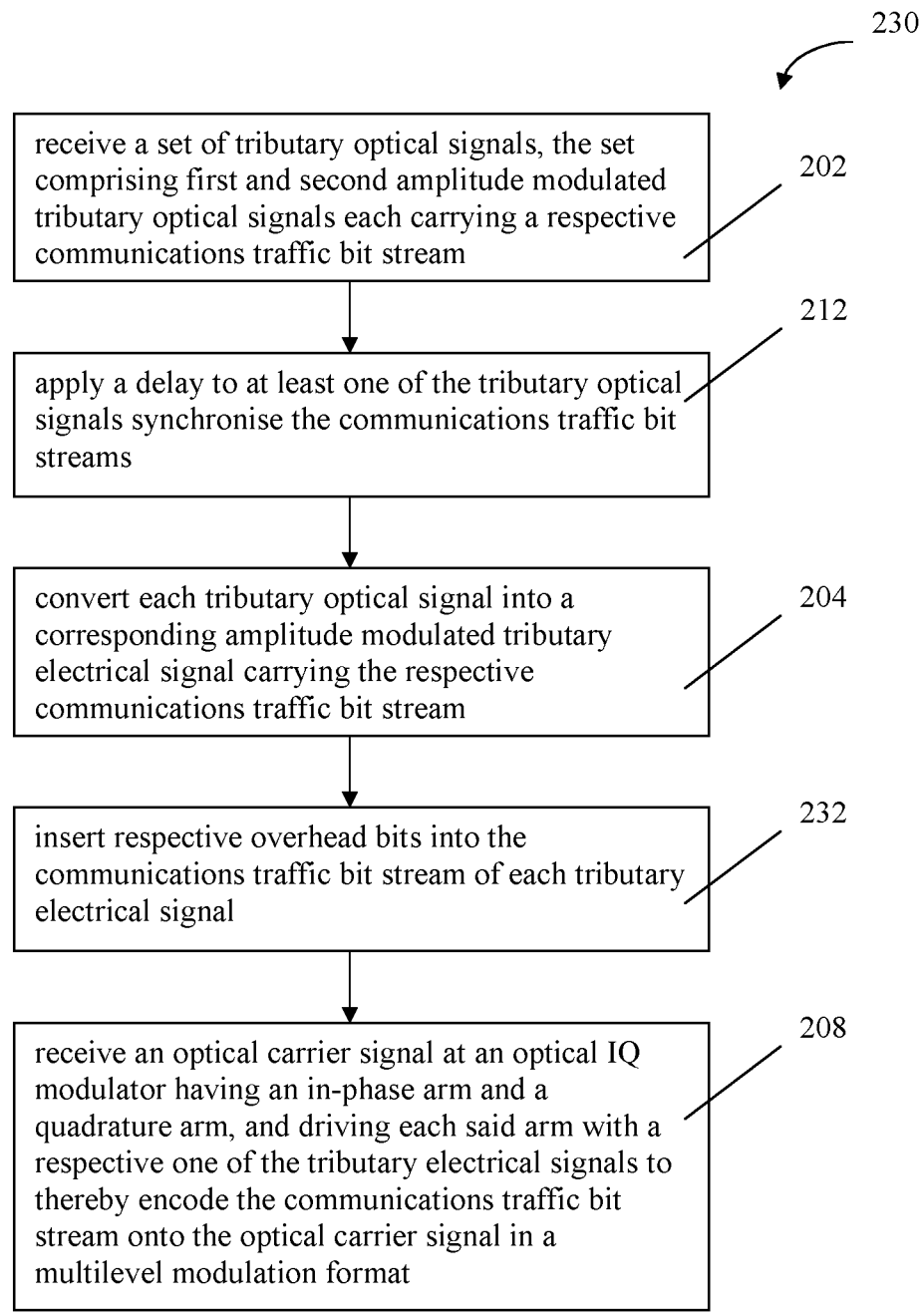
FIG. 15 shows the steps of a method according to a fourteenth embodiment of the invention of converting a plurality of tributary optical communications signals having a first bit rate into an optical line signal having a second, higher bit rate.

A fourteenth embodiment of the invention provides a method 230 of converting a plurality of tributary optical communications signals having a first bit rate into an optical line signal having a second, higher bit rate. The steps of the method 230, shown in FIG. 15, are similar to the steps of the method 210 shown in FIG. 13, with the following modifications. The same reference numbers are retained for corresponding steps.

In this embodiment, the method 230 further comprises inserting respective overhead bits into the communications traffic bit stream of each tributary electrical signal 232.

Figure 16:
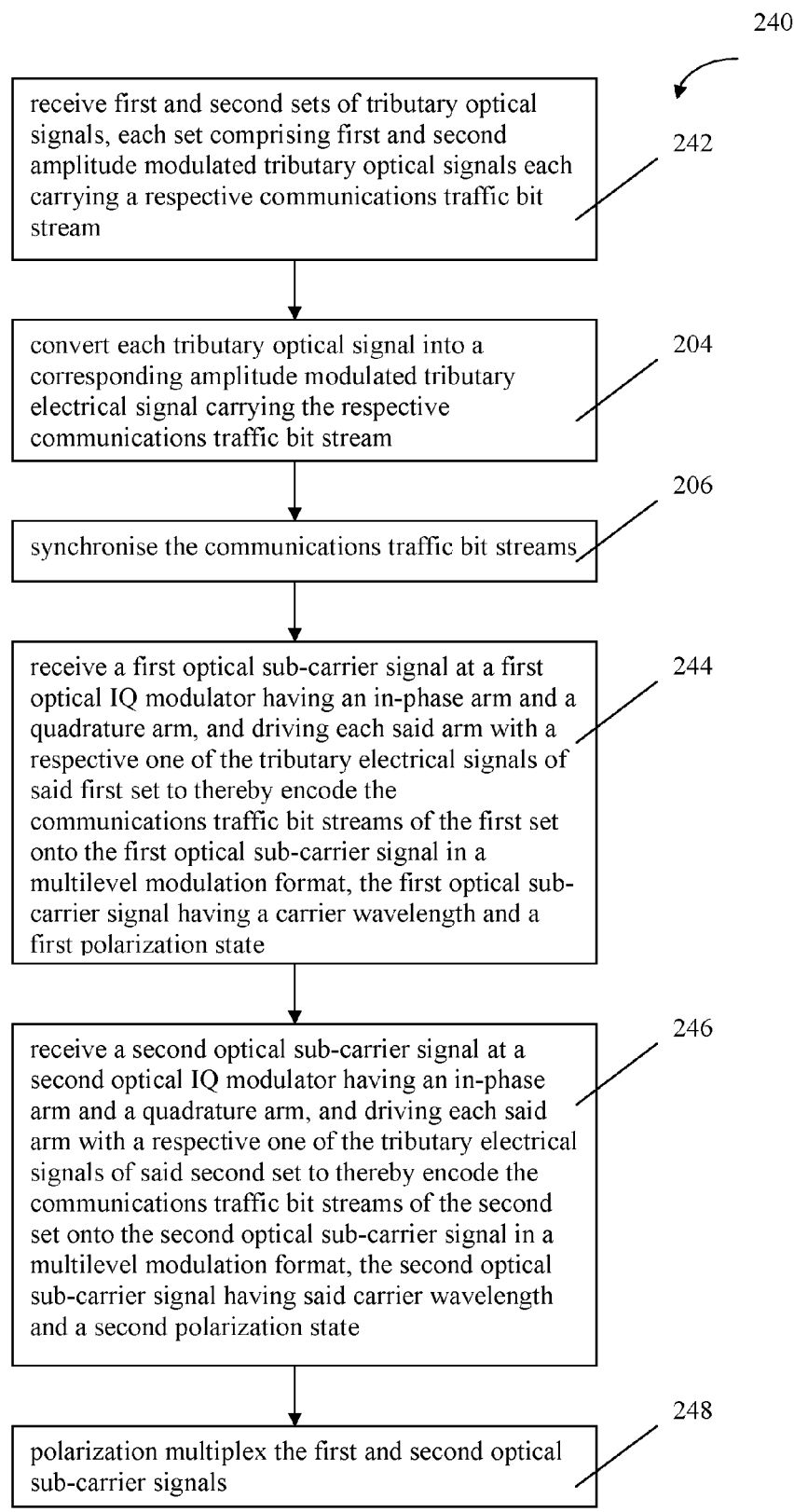
FIG. 16 shows the steps of a method according to a fifteenth embodiment of the invention of converting a plurality of tributary optical communications signals having a first bit rate into an optical line signal having a second, higher bit rate.

A fifteenth embodiment of the invention provides a method 240 of converting a plurality of tributary optical communications signals having a first bit rate into an optical line signal having a second, higher bit rate. The steps of the method 240, shown in FIG. 16, are similar to the steps of the method 200 shown in FIG. 12, with the following modifications. The same reference numbers are retained for corresponding steps.

In this embodiment, step a. comprises receiving a first set of tributary optical signals and a second set of tributary optical signals 242. Each set comprises first and second amplitude modulated tributary optical signals each carrying a respective communications traffic bit stream.

Step d. comprises receiving a first optical sub-carrier signal at a first optical IQ modulator having an in-phase arm and a quadrature arm 244. The first optical sub-carrier signal has a carrier wavelength and a first polarization state. Step d. further comprises driving each arm of the first optical IQ modulator with a respective one of the tributary electrical signals of the first set. The communications traffic bit streams of the first set are thus encoded onto the first optical sub-carrier signal in a multilevel modulation format.

Step d. further comprises receiving a second optical sub-carrier signal at a second optical IQ modulator having an in-phase arm and a quadrature arm 246. The second optical sub-carrier signal has the same carrier wavelength and a second polarization state. Step d. further comprises driving each arm of the second optical IQ modulator with a respective one of the tributary electrical signals of the second set. The communications traffic bit streams of the second set are thereby encoded onto the second optical sub-carrier signal in a multilevel modulation format.

Following modulation by the respective optical IQ modulators, the first and second optical sub-carrier signals are polarization multiplexed 248, to form a dual polarisation optical carrier signal having the carrier wavelength and carrying the communications traffic bit streams encoded in the multilevel modulation format.

Figure 17:
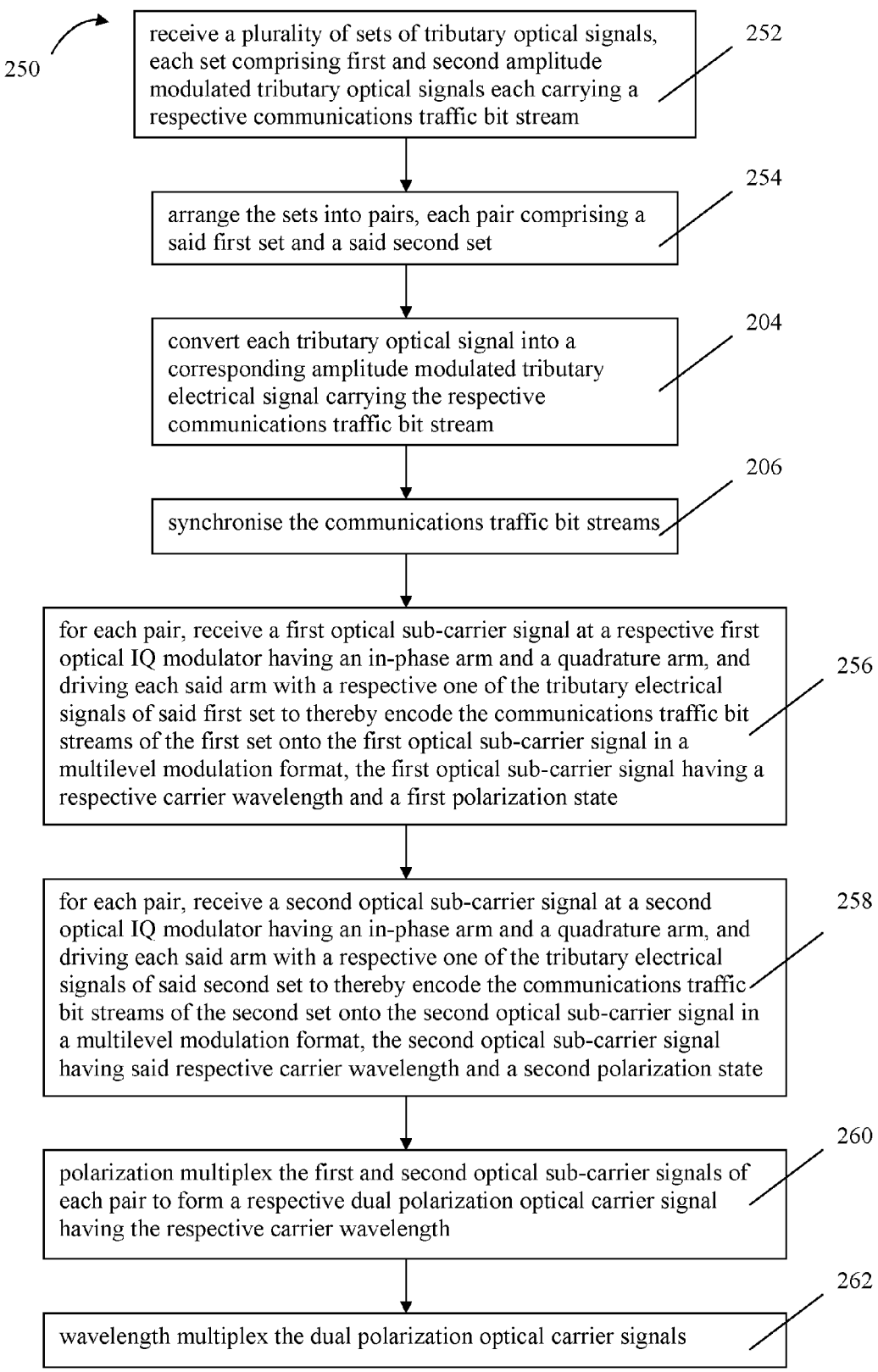
FIG. 17 shows the steps of a method according to a sixteenth embodiment of the invention of converting a plurality of tributary optical communications signals having a first bit rate into an optical line signal having a second, higher bit rate.

A sixteenth embodiment of the invention provides a method 250 of converting a plurality of tributary optical communications signals having a first bit rate into an optical line signal having a second, higher bit rate. The steps of the method 250, shown in FIG. 17, are similar to the steps of the method 200 shown in FIG. 12, with the following modifications. The same reference numbers are retained for corresponding steps.

In this embodiment, the method 250 comprises receiving a plurality of sets of tributary optical signals 252. Each set comprises first and second amplitude modulated tributary optical signals, each carrying a respective communications traffic bit stream. The sets are arranged into pairs, each pair comprising a first set and a second set 254.

Each tributary optical signal is then converted into a corresponding amplitude modulated tributary electrical signal carrying the respective communications traffic bit stream 204.

For each pair of sets, a first optical sub-carrier signal is received at a respective first optical IQ modulator having an in-phase arm and a quadrature arm 256. The first optical sub-carrier signal has a respective carrier wavelength and a first polarization state. Each arm of the optical IQ modulator is driven with a respective one of the tributary electrical signals of the first set 256. The communications traffic bit streams of the first set are thereby encoded onto the first optical sub-carrier signal in a multilevel modulation format.

For each pair of sets, receive a second optical sub-carrier signal at a second optical IQ modulator having an in-phase arm and a quadrature arm 258. The second optical sub-carrier signal has the same carrier wavelength as the first optical sub-carrier signal of its respective pair and a second, orthogonal, polarization state. Each arm of the second optical IQ modulator is driven with a respective one of the tributary electrical signals of the second set. The communications traffic bit streams of the second set are thereby encoded onto the second optical sub-carrier signal in the multilevel modulation format.

The method 250 further comprises polarization multiplexing the first and second optical sub-carrier signals of each pair to form a respective dual polarization optical carrier signal having the respective carrier wavelength. The dual polarization optical carrier signals are then wavelength multiplexed 262, to thereby form an output optical line signal.

A seventeenth embodiment of the invention provides a data carrier having computer readable instructions embodied therein. The computer readable instructions are for providing access to resources available on a processor. The computer readable instructions comprise instructions to cause the processor to perform any of the steps of the method of converting a plurality of tributary optical communications signals having a first bit rate into an optical line signal having a second, higher bit rate, according to any of the eleventh to sixteenth embodiment of the invention.

The invention claimed is:
1. A muxponder comprising:
 a modulation format conversion apparatus comprising:
  first and second inputs each arranged to receive separately a respective binary amplitude modulated tributary optical signal carrying a respective communications traffic bit stream at a first bit rate;
  first and second optical to electrical signal conversion apparatus each arranged to convert a respective one of the tributary optical signals into a corresponding amplitude modulated tributary electrical signal carrying the respective communications traffic bit stream;

at least one delay element arranged to synchronize the communications traffic bit streams; and an optical IQ (in-phase and quadrature) modulator arranged to receive an optical carrier signal and the tributary electrical signals, wherein the optical IQ modulator has an in-phase (I) arm and a quadrature (Q) arm, each arm being arranged to receive a respective one of the tributary electrical signals such that one of said tributary electrical signals drives the I arm of the optical IQ modulator and the other of the tributary electrical signals drives the Q arm of the optical IQ modulator to thereby encode the communications traffic bit streams onto the optical carrier signal in a multilevel modulation format having a second bit rate, that is an aggregate of the two communications traffic bit stream, and in which the second bit rate is higher than the first bit rate, wherein the at least one delay element is an optical delay line provided before the respective optical to electrical signal conversion apparatus.

2. The muxponder as claimed in claim 1, wherein the modulation format conversion apparatus further comprises:

third and fourth inputs, each arranged to receive separately a respective binary amplitude modulated tributary optical signal at the first bit rate; and first and second optical signal combining apparatus, the first optical signal combining apparatus being provided between the first and second inputs and the first optical to electrical signal conversion apparatus, and the second optical signal combining apparatus being provided between the third and fourth inputs and the second optical to electrical signal conversion apparatus, each optical signal combining apparatus being arranged to receive said tributary optical signal from each respective input and being arranged to combine the binary amplitude modulated tributary optical signals to form a respective tributary optical signal having a four-level modulation format.

3. The muxponder as claimed in claim 1, wherein the muxponder further comprises first and second overhead insertion apparatus each provided between the respective optical to electrical signal conversion apparatus and the optical modulator, each overhead insertion apparatus being arranged to insert respective overhead bits into the communications traffic bit stream of the respective tributary electrical signal.

4. The muxponder as claimed in claim 1, wherein the muxponder comprises a multiplexing stage comprising:

first and second of said modulation format conversion apparatus, the optical IQ modulator of the first said apparatus being arranged to receive a first optical sub-carrier signal having a carrier wavelength and a first polarisation state, and the optical IQ modulator of the second said apparatus being arranged to receive a second optical sub-carrier signal having the carrier wavelength and a second polarisation state; and a polarisation beam combiner arranged to receive the first and second optical sub-carrier signals from the optical modulator and arranged to polarisation multiplex the first and second optical sub-carrier signals to form a dual polarisation optical carrier signal having the carrier wavelength and carrying the communications traffic bit streams encoded in the multilevel modulation format.

5. The muxponder as claimed in claim 4, wherein the muxponder comprises:

a plurality of said multiplexing stages, each arranged to form a dual polarisation optical carrier signal having a different carrier wavelength and carrying respective communications traffic bit streams encoded in the multilevel modulation format; and an optical multiplexer arranged to receive and wavelength multiplex said dual polarisation optical carrier signals.

6. The muxponder as claimed in claim 1, wherein the amplitude modulated tributary optical signals are modulated in an on-off keying modulation format and the multilevel modulation format is one of quaternary phase-shift keying and 16-quadrature amplitude modulation.

7. A communications network node comprising:

a muxponder comprising:

a modulation format conversion apparatus comprising:

first and second inputs each arranged to receive separately a respective binary amplitude modulated tributary optical signal carrying a respective communications traffic bit stream at a first bit rate;

first and second optical to electrical signal conversion apparatus each arranged to convert a respective one of the tributary optical signals into a corresponding amplitude modulated tributary electrical signal carrying the respective communications traffic bit stream;

at least one delay element arranged to synchronize the communications traffic bit streams; and an optical IQ (in-phase and quadrature) modulator arranged to receive an optical carrier signal and the tributary electrical signals, wherein the optical IQ modulator has an in-phase (I) arm and a quadrature (Q) arm, each arm being arranged to receive a respective one of the tributary electrical signals such that one of said tributary electrical signals drives the I arm of the optical IQ modulator and the other of the tributary electrical signals drives the Q arm of the optical IQ modulator to thereby encode the communications traffic bit streams onto the optical carrier signal in a multilevel modulation format having a second bit rate, that is an aggregate of the two communications traffic bit stream, and in which the second bit rate is higher than the first bit rate, and an optical signal source for the modulation format conversion apparatus, the optical signal source being arranged to generate the optical carrier signal, wherein the at least one delay element is an optical delay line provided before the respective optical to electrical signal conversion apparatus.

8. A method of converting a plurality of tributary optical communications signals having a first bit rate into an optical line signal having a second, higher bit rate, the method comprising:

a. receiving separately a set of tributary optical signals, the set comprising first and second binary amplitude modulated tributary optical signals, each carrying a respective communications traffic bit stream at a first bit rate;

b. converting each amplitude modulated tributary optical signal into a corresponding amplitude modulated tributary electrical signal carrying the respective communications traffic bit stream;

c. synchronising the communications traffic bit streams; and d. receiving an optical carrier signal at an optical IQ (in-phase and quadrature) modulator having an in-phase arm (I) and a quadrature (Q) arm, and driving the I arm with one of the tributary electrical signals, and driving the Q arm with the other of the tributary electrical signals, to thereby encode the communications traffic bit streams onto the optical carrier signal in a multilevel modulation format having the second bit rate, that is an aggregate of the two communication traffic bit patterns, wherein the synchronising the communications traffic bit streams comprises applying a delay to at least one of the tributary optical signals to synchronise the communications traffic bit streams, and wherein the delay is an optical delay that is provided before the converting step b, using an optical delay line.

9. The method as claimed in claim 8, wherein:

the receiving separately the set of tributary optical signals further comprises:

receiving the set of tributary optical signals, the set further comprising third and fourth binary amplitude modulated tributary optical signals each carrying a respective communications traffic bit stream; and combining the first and second amplitude modulated tributary optical signals to form a first combined tributary optical signal having a four-level modulation format and combining the third and fourth amplitude modulated tributary optical signals to form a second combined tributary optical signal having said four-level modulation format;

and the converting further comprises converting each combined tributary optical signal into a corresponding tributary electrical signal.

10. The method as claimed in claim 8, wherein the method further comprises inserting respective overhead bits into the communications traffic bit stream of each tributary electrical signal.

11. The method as claimed in claim 8, wherein:

the receiving separately the set of tributary optical signals further comprises receiving said set of tributary optical signals as a first set and receiving a second said set of tributary optical signals; and the receiving the optical carrier signal comprises:

receiving a first optical sub-carrier signal at a first optical IQ modulator having an in-phase arm and a quadrature arm, and driving each said arm with a respective one of the tributary electrical signals of said first set to thereby encode the communications traffic bit streams of the first set onto the first optical sub-carrier signal in a multilevel modulation format, the first optical sub-carrier signal having a carrier wavelength and a first polarization state; and receiving a second optical sub-carrier signal at a second optical IQ modulator having an in-phase arm and a quadrature arm, and driving each said arm with a respective one of the tributary electrical signals of said second set to thereby encode the communications traffic bit streams of the second set onto a second optical sub-carrier signal in the multilevel modulation format, the second optical sub-carrier signal having the carrier wavelength and a second polarization state;

and wherein the method further comprises polarization multiplexing the first and second optical sub-carrier signals to form a dual polarisation optical carrier signal having the carrier wavelength and carrying the communications traffic bit streams encoded in the multilevel modulation format.

12. The method as claimed in claim 11, wherein the method further comprises:

receiving a plurality of said sets of binary amplitude modulated tributary optical signals separately;

arranging the sets into pairs, each pair comprising said first set and said second set;

carrying out steps a. to d. for each pair of sets of tributary optical signals, the optical carrier wavelength being different for each pair; and wavelength multiplexing the dual polarization optical carrier signals.

13. The method as claimed in claim 8, wherein the amplitude modulated tributary optical signals are modulated in an on-off keying modulation format and the multilevel modulation format is one of quaternary phase-shift keying and 16-quadrature amplitude modulation.

* * * * *